United States Patent [19]

Kabb et al.

[11] Patent Number: 4,699,504

[45] Date of Patent: Oct. 13, 1987

[54] CONTROL SYSTEM FOR MICROIMAGE RECORDERS

[75] Inventors: Harold L. Kabb, Buffalo Grove; John R. Flint, Barrington, both of Ill.; Gary B. Videlock, Foxborough, Mass.; Ishfaq A. Niazi, Des Plaines, Ill.; Kenneth L. Hendrickson, Glenview, Ill.; Gary S. Slutsky, Evanston, Ill.; Stuart F. Schwalb, Buffalo Grove, Ill.; John J. Carroll, Elmhurst, Ill.; Paul H. Friedrich, Glenview, Ill.

[73] Assignee: Bell & Howell Company, Chicago, Ill.

[21] Appl. No.: 893,750

[22] Filed: Aug. 6, 1986

[51] Int. Cl.⁴ .................. G03B 27/72; G03B 27/80
[52] U.S. Cl. .................. 355/20; 250/214 P; 355/68
[58] Field of Search .................. 355/20, 67, 68, 83; 346/110 R; 430/30; 250/214 P, 319

[56] References Cited

U.S. PATENT DOCUMENTS

| | | | |
|---|---|---|---|
| 2,927,210 | 3/1960 | O'Mara | 250/319 |
| 2,952,780 | 9/1960 | Rogers, Jr. | 250/214 P |
| 3,400,632 | 9/1968 | Wahli | 355/68 |
| 3,513,308 | 5/1970 | Tajima et al. | 430/30 |
| 3,938,164 | 2/1976 | Ohnishi et al. | 346/110 R |
| 3,985,440 | 10/1976 | Dennhardt et al. | 355/68 |
| 4,104,069 | 8/1978 | Vanheerentals et al. | 355/68 X |
| 4,175,856 | 11/1979 | Pone, Jr. | 355/68 |
| 4,278,347 | 7/1981 | Okamoto et al. | 355/68 |
| 4,344,699 | 8/1982 | McIntosh | 355/20 |

Primary Examiner—Richard A. Wintercorn
Attorney, Agent, or Firm—Neal C. Johnson; Stanley J. Tomsa; Joan Pennington

[57] ABSTRACT

A distributed processor control system for use with a microimage recording apparatus includes a system control unit, a machine control unit and an operator control unit. The system control unit includes a microprocessor that provides supervisory or master control for the overall distributed control system. The machine control unit includes at least one microprocessor for controlling the operations of a plurality of electromechanical components within the microimage recording apparatus in response to commands and parameters provided by the system control unit and for providing status and error information and requests to the system control unit. The operator control unit includes a microprocessor for controlling the display of operational status and error indications and messages for viewing by an operator and for receiving manual operator entries for enabling normal operation of and diagnostics for the microimage recording apparatus. A shared memory device is utilized for bidirectional communications between the system control unit and the machine control unit. An asynchronous, bidirectional serial link enables bidirectional data transfer between the system control unit and the operator control unit.

38 Claims, 16 Drawing Figures

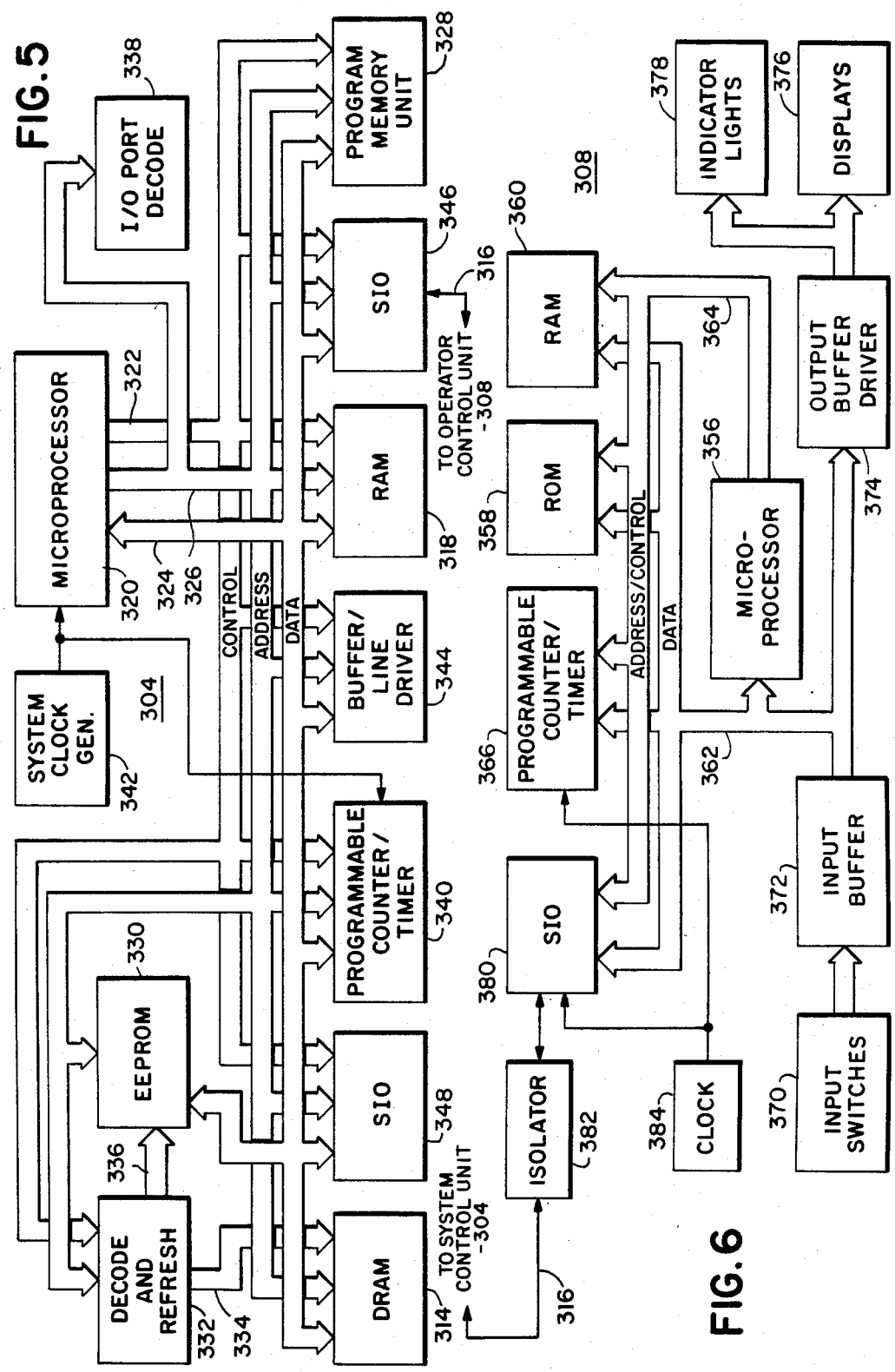

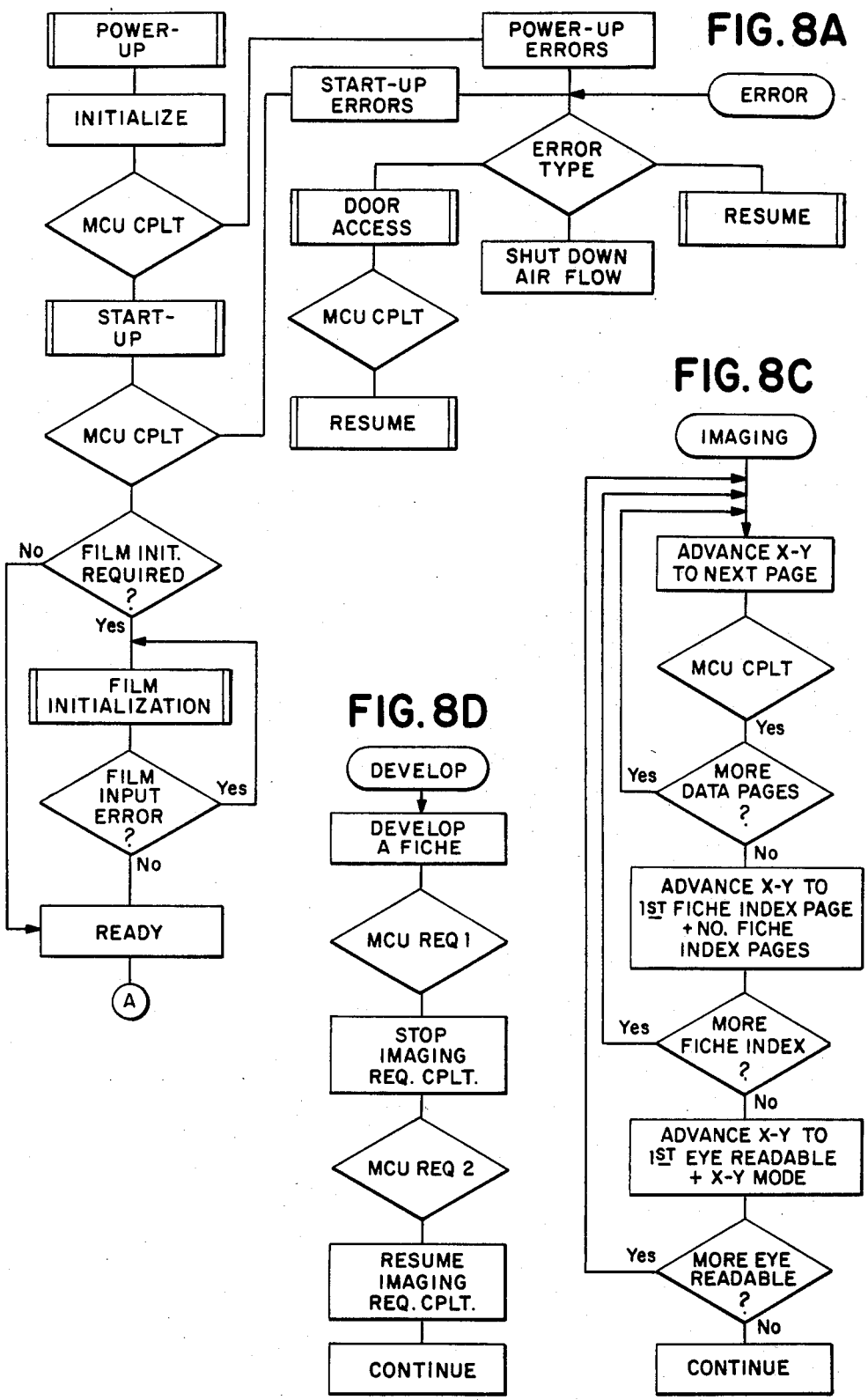

CONTROL SYSTEM FOR MICROIMAGE RECORDERS

BACKGROUND OF THE INVENTION

The present invention relates to micrographics and more particularly to an improved control system for microimage recorders such as COM (Computer Output on Microfilm) recorders.

The use of microimage records such as microfilm rolls or microfiche cards to retain, distribute and display the enormous amounts of information and data generated by computers and other sources has increased dramatically in recent years. It is far more economical and efficient to distribute microimage records than huge stacks of computer generated and printed documents.

U.S. Pat. Nos. 4,123,157; 4,332,466; 4,382,675 and 4,501,487 disclose microimage recorders where images are exposed onto film and then transferred onto microfiche cards or roll film. In the '466 patent, a linear array of images is exposed onto a master film 5 from a cathode ray tube (CRT) and subsequently transferred onto a film 19'. A carriage 20 supporting the film 19' is moved relative to the film 5 each time a single image or frame is to be transferred. A system timing and control circuit 12 provides timing and motor control for the movement of the films 5 and 19'. In the '487 patent, a linear array of images is exposed from a document receiving platform onto a film 12. Images are transferred to a microfiche film card carried in a carriage 54 that is moved each time an image is to be transferred and is controlled by a system timing and control circuit 62.

In the '675 patent, a central control means 79 is described for controlling the operation of a microimage recorder including a CRT display that is imaged onto a film within a cassette mounted on a carriage assembly 39. Carriage 39 is moved along rods 40 to a transfer station 43 where the image is transferred onto a film 42a. Film 42a is disposed on a carriage 45 shiftable relative to the first carriage assembly 39 to transfer the image frames. Another example of transferring film images using systems with shiftable carriages is shown in the '157 patent that also describes a central control logic 174.

In all of the systems disclosed in the abovementioned patents, the sequential operations of the microimage recorders are controlled by a central timing and logic circuit. None is directed to a distributed computer control system that enables efficient and reliable operation of and diagnostic capability for the microimage recorders.

SUMMARY OF THE INVENTION

Among the important objects of the present invention are to provide a new and improved control system for microimage recording apparatus and more particularly a new, improved, efficient and reliable control system for microimage recorders such as COM recorders. Other objects are to provide a distributed control system for use with an integral or self-contained recorder in which computer output data or the like is delivered from the machine in completed form as individual microfiche records; to provide an improved control system for use with a microimage recorder including a master processor and multiple slave processors that are arranged to simultaneously and independently execute tasks to efficiently process normal recorder sequences of operation and to provide error diagnostics for the microimage recorder.

In brief, the above and other objects of the invention are achieved by providing a distributed control system for use with a microimage recorder including a system control unit, a machine control unit and operator control unit. The system control unit includes a processor unit that provides supervisory or master control for the distributed control system. The machine control unit includes at least one processor unit for controlling the operations of a plurality of electromechanical components within the microimage recorder in response to commands and parameters provided by the system control unit and for providing status information and requests to the system control unit. The operator control unit includes a display means for displaying status and error indications and messages for viewing by an operator of the microimage recorder. The operator control unit includes a plurality of manually operated switches for receiving operator control entries and a processor unit for controlling the display of operational status indications and messages for viewing by the operator and for receiving manual operator entries for enabling normal operation of and diagnostics for the microimage recorder. A shared memory device is utilized for bidirectional communication between the system control unit and the machine control unit. An asynchronous, bidirectional serial link enables data transfer between the system control unit and the operator control unit.

The machine control unit includes a master machine processor unit, a first slave processor unit for controlling the operations of a plurality of electromechanical components for exposing an array of discrete images on a master film strip, a second slave processor for controlling the operations of a plurality of electromechanical components for moving a master film strip and developing the array on the master film strip and a third slave processor for controlling the operations of a plurality of electromechanical components for duplicating the array. The master machine processor receives commands and parameters from the system control unit and transfers status, error and request data and command complete acknowledgement to the system control unit. The master machine processor decodes the received commands and parameters, writes slave commands and parameters to selected slave processor units, and receives status and error conditions from the slave processor units.

BRIEF DESCRIPTION OF THE DRAWING

The above and other objects and advantages of the invention may best be understood from consideration of the following detailed description of the embodiments of the invention shown in the accompanying drawings, wherein:

FIG. 5 is a partially schematic and block diagram representation of a system control unit of the control system of FIG. 4;

FIG. 6 is a partially schematic and block diagram representation of an operator control unit of the control system of FIG. 4.

FIGS. 8A and 8B are a flow chart illustrating the logical operations performed by the system control unit of FIG. 5; and FIGS. 8C-8H are flow charts illustrating sequential steps within the logical operations of FIGS. 8A and 8B.

DESCRIPTION OF THE PREFERRED EMBODIMENTS

A control system constructed in accordance with the principles of the present invention advantageously may be employed with microimage recorders. Before the control system is described in detail, a preferred microimage recorder now is described.

Figure 1:
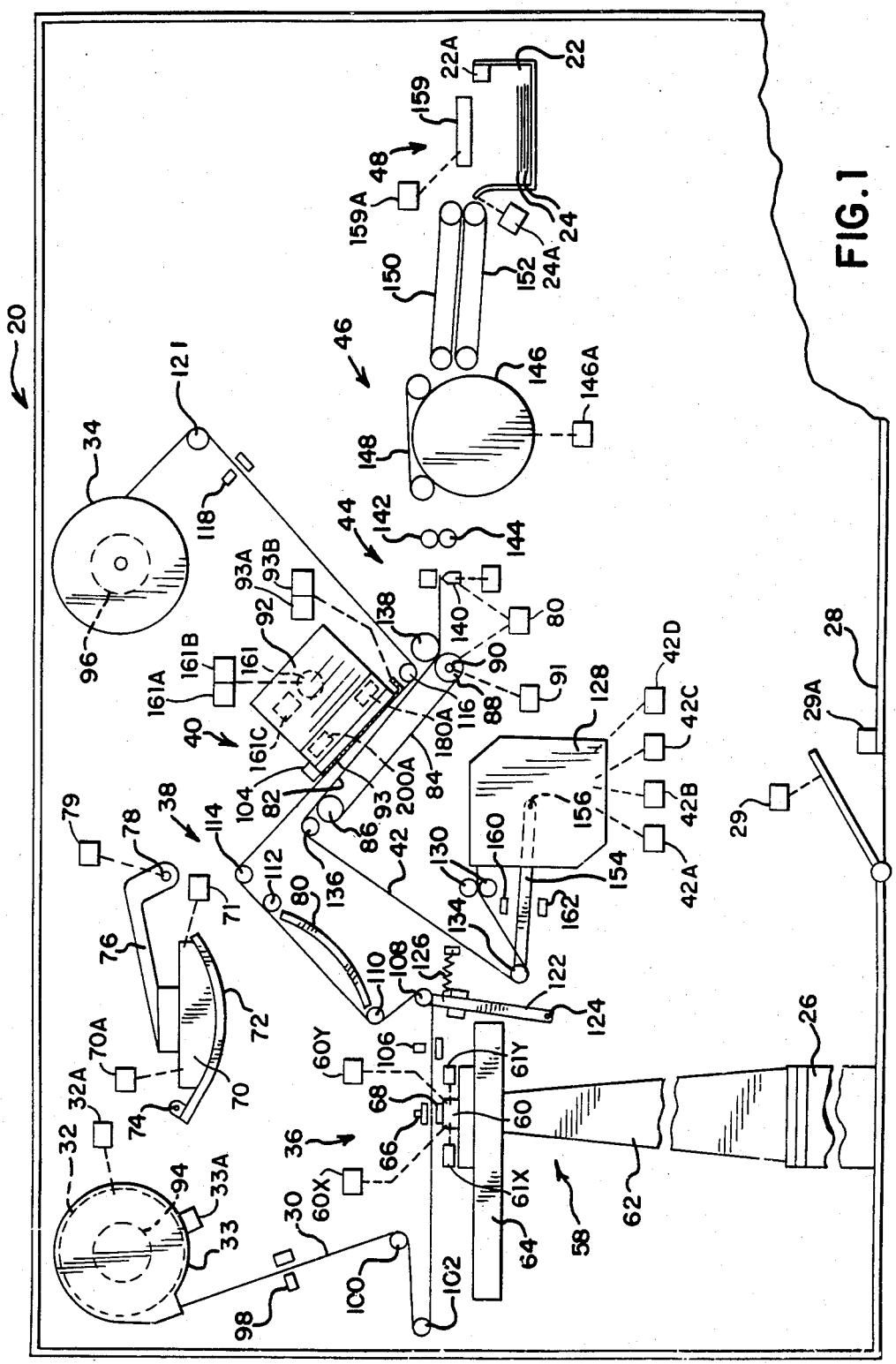
FIG. 1 is a schematic and diagrammatic front view of a microimage recorder.

Having reference now to the drawings, and initially to FIG. 1, there is illustrated in schematic and diagrammatic form a self-contained microimage recorder designated as a whole by the reference numeral 20. The microimage recorder 20 is described in detail in patent application Ser. No. 787,812 filed on Oct. 15, 1985, now U.S. Pat. No. 4,624,558 issued Nov. 25, 1986 and incorporated herein by reference.

Recorder 20 is an integral or unitary apparatus serving to provide at a recorder output port 22 completed discrete microfiche records or cards 24 bearing an image pattern corresponding to a sequence of computer generated images provided by a cathode ray tube (CRT) 26. It should be understood that features of the present invention are applicable to various types of COM (Computer Output on Microfilm) and other microimage recording systems whether using CRT displays, master scan laser imaging or other imaging or display arrangements.

A single housing 28 contains the components of the microimage recorder 20. A door unlatch solenoid 29 is controllably operated to limit access to the interior of the housing 28. A position sensor 29A is provided at the door of the housing 28 to provide a signal indicating that the door is ajar or open. A strip 30 of master film travels along a processing path extending between a supply spool 32 and a take up spool 34 through an exposure station generally designated as 36, a master film developing station generally designated as 38 and a duplication station generally designated as 40. A film supply sensor 32A is positioned at the supply spool 32 to provide a signal indicating proper tension for the master film strip 30. A duplicate film strip 42 moves along a duplicate film processing path including the duplication station 40, a cutting station generally designated as 44, a duplicate film developing station generally designated as 46 and a clearing station generally designated as 48. A plurality of sensors 42A, 42B, 42C and 42D are positioned proximate to the duplicate film cartridge 128 to provide signals indicating the film type and film speeds.

The master film strip 30 and the duplicate film strip 42 move along linear or continuous paths and an X-Y pattern or array of images is provided on the completed microfiche records 24 without the necessity for complex relative movement of film carriages or the like. The duplicate film strip 42 is consumed within the self-contained microimage recorder 20 by cutting of individual microfiche records 24 from the end of the strip 42.

Figure 2:
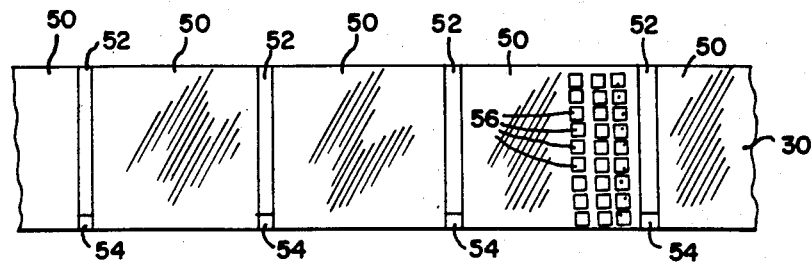
FIG. 2 illustrates a segment of an exemplary strip of master film having a sequence of image areas processed by the microimage recorder of FIG. 1.

A segment of the master film strip 30 is shown in FIG. 2. In the illustrated embodiments of the invention, the master film is a 105 millimeter dry silver COM film such as type 8500 film offered by 3M Corporation. This film is sensitive to light and preferably is maintained in light-tight enclosures until imaged. In the illustrated arrangement, the supply spool 32 for the master film strip 30 is within a light-sealed cartridge 33 (FIG. 1) of the type disclosed in patent application Ser. No. 787,836 filed on Oct. 16, 1985, now U.S. Pat. No. 4,634,071 issued Jan. 6, 1987 and incorporated herein by reference. A detector in the form of a switch 33A detects the installed cassette 33 to provide a signal when the cartridge 33 is operatively positioned within the recorder 20.

After processing within the microimage recorder 20 in the manner described in detail below, the master film strip 30 as shown in FIG. 2 includes a sequence or linear array of image areas 50 separated by guard bands 52 providing margins which are desirable when the image areas 50 are developed by the application of heat. Indexing marks or blips 54 are generated in the region of the guard bands 52 to assist in controlling the travel of the master film strip 30 along its processing path. Blips may be provided at other locations on the film if preferred.

Each image area 50 includes an array or pattern of discrete images or frames 56. In the illustrated system, the images are in an X-Y pattern of rows and columns. Other patterns or arrays are possible, as are partial patterns and other alternatives. In a typical format, 270 images or frames may be included on each image area 50. If desired, the image areas may also be provided with titles or other machine or human readable indicia (not shown).

Referring again to FIG. 1, a pattern or array of images is exposed onto an image area 50 of the master film strip 30 at the exposure station 36. An optics assembly generally designated as 58 includes a lens 60 for focusing light images provided by the CRT 26 onto the master film 30. A movable light shroud 62 confines light from the CRT to the desired region. An X-Y positioner 64 moves the lens 60 through the controlled operation of a pair of stepping motors 60X and 60Y to numerous different positions in rows and columns or other pattern in any desired sequence within a master film image area 50. A pair of position sensors 61X and 61Y provide signals indicating the X and Y home positions of the lens 60. The lens 60 is repositioned between successive operations of the CRT 26 while the master film strip 30 remains stationary in order to create a latent or undeveloped array or pattern of individual images 56. During exposure of each discrete image or frame, an aperture clamp 66 is closed against a lens aperture block 68 precisely to position the master film in the proper plane for expo- sure.

Simultaneous development of the latent, exposed images within an image area 50 of the master film strip 30 is carried out at the master film developing station 38 by the application of heat. A developer shoe 70 is maintained at a predetermined temperature by the operation of a temperature controller 70A and is normally covered by a heat shield 72 pivotable about axis 74. Shoe 70 is carried by a pivot arm 76, and in a developing operation, the shoe 70 pivots down against film strip 30 about a shaft 78 driven by a motor 79 while the heat shield 72 swings out of the way. An image area 50 of the master film strip 30 is held in intimate contact between the shoe 70 and a back up member 80 for a predetermined time interval until development is complete. The components and operation of the developing station 38 are described in more detail in patent application Ser. No. 787,898 filed on Oct. 16, 1985, now U.S. Pat. No. 4,653,890, issued Mar. 31, 1987, and incorporated herein by reference.

An entire array or pattern of developed images is transferred to a corresponding image area of the duplicate film strip 42 at the duplication station 40 where the master film path and the duplicate film path merge. A vacuum clamp 82 holds the master film and duplicate film stationary and in contact with one another against a glass platen 93 during a duplication operation. The vacuum clamp 82 includes an endless perforated belt 84 driven by a forward/reverse motor 85. Belt 84 is trained around rollers 86 and 88 and is pivotally movable about a shaft 90 driven by a motor 91. As described in patent application Ser. No. 788,283 filed on Oct. 17, 1985, now U.S. Pat. No. 4,626,099, issued Dec. 2, 1986, and incorporated herein by reference, vacuum within belt 84 holds the duplicate film strip 42 firmly against the vacuum clamp 82 and cooperates in moving the strip 42 along the duplicate film processing path. As described in detail in the above-referenced application, the duplication station 40 includes a reflector housing 92 associated with a safety shutter and a main shutter (not shown) for permitting light from an exposure lamp 161 to expose an image area on the duplicate film strip in accordance with the developed image area on the master film strip. A pair of sensors 180A and 200A are positioned within the housing 92 to detect an open position of the shutters 180 and 200 and provide signals representative thereof. A pair of relays 161A and 161B are controlled to vary the power level applied to the exposure lamp 161 and thereby to vary the light intensity of the lamp. A light sensor 161C detects the light from lamp 161 to provide a signal indicative of light output.

Figure 3:
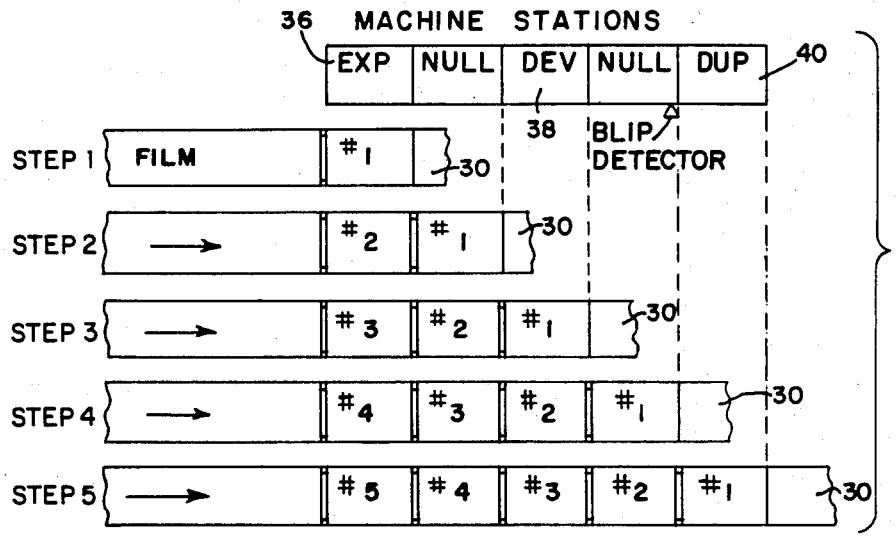
FIG. 3 illustrates the process sequence of the master film at various processing stations along the master film path in the microimage recorder of FIG. 1.

FIG. 3 illustrates in tabular form the sequence of processing operations carried out on the master film strip 30 in the exposure, developing and duplication stations 36, 38 and 40. Step 1 illustrates a first image area 50 designated as #1 at the exposure station 36. For example, at the start of a cycle of numerous repetitive operations of the microimage recorder 20, the master film strip is advanced from cartridge 33 to the exposure station 36 and stopped. While the film is stationary, a pattern or array of numerous discrete images is exposed one at a time onto the image area #1.

When exposure of the desired pattern of images at image area #1 is completed, the master film strip 30 is advanced along the film path one step through a distance equal to the length of one image area 50 plus one guard band 52 to position image area #2 at the exposure station. While image area #2 is being exposed, image area #1 resides in a first null position. Although FIG. 1 is not necessarily to scale, it should be understood that the null position is that portion of the master film processing path between the exposure station 36 and the developing station 38.

After image area #2 is exposed, the master film strip 30 is advanced another step to position image area #3 at the exposure station. At this point in the process, image area #2 is at the first null position and image area #1 is located at the developing station 38. While the film is stationary in this position labelled as "STEP 3", image area #3 is exposed while image area #1 is developed.

When these operations are completed, the film is advanced another step to the position indicated as "STEP 4". In order to prevent damage to the developed images, the master film strip 30 is preferably not moved following a developing operation until sufficient time has elapsed to permit cooling of the heated emulsion. When the film is advanced, developed image area #1 resides at a second null position along the film path between the developing station 38 and the exposure station 40.

After image area #4 is exposed and image area #2 is developed, the master film strip 30 is advanced another step as indicated in "STEP 5" to position image area #1 at the duplication station, #3 at the developing station and #5 at the exposure stat tion, with image areas #2 and #4 being positioned at the null positions. At this time exposure, developing and duplication operations may occur simultaneously at image areas #5, #3 and #1, respectively. In order to prevent interference with the exposure operation due to mechanical shock or vibration, the exposure operation is interrupted during movement of machine components such as the developer shoe 70 and the vacuum clamp 82.

An important advantage of this film processing sequence is that the master film strip 30 need only move along a continuous and linear path between the supply spool 32 and take up spool 34 without the necessity for shifting in a transverse direction relative to the duplicate film strip 42. The positioning of the lens 60 by the controlled operation of the stepping motors 60X and 60Y provides the array or row and column pattern of images 56, and this array or pattern is subsequently developed and duplicated as a unit.

In order to control the movement of the master film strip 30 along the master film processing path, a supply drive motor 94 and a take up drive motor 96 are provided. Preferably, both drive motors are DC motors connected through a gear set (not shown) to drive the supply spool 32 and the take up spool 34. When a supply cartridge 33 is loaded into the microimage recorder 20, the leading end of the master film strip 30 is threaded into the processing path leading to the take up spool 34. Preferably a leader permanently associated with the take up spool 34 and initially positioned in the master film strip path is attached to the leading end of the master film strip 30 adjacent the cassette 33. When the strip 30 of master film is depleted, the motor 94 is operated to rewind the strip 30 into the cartridge 33 and to return the leader along the master film path to the vicinity of the cartridge 33. Strip 30 can then be detached from the leader and a new cartridge may be loaded.

Within the self-contained microimage recorder 20, the film strip travels from the spool 32 through a film clamp 98 and around an idler roller 100 to an encoder roller 102. As described in more detail in U.S. Pat. No. 4,148,579, incorporated herein by reference, the encoder roller 102 is associated with a transparent disc having a plurality of uniformly spaced marks interrupting a light path between a light source and a photodetector to provide output pulses counted by a logic circuit accurately to detect the amount of film movement.

Film position is detected by means of the blips 54 and a blip detector 104 positioned adjacent to the duplication station 40 and operating in combination with the encoder roller 102. Blips 54 are applied to the film strip 30 by the CRT 26 and the optics assembly 58 of the exposure station 36 and may be located in the guard bands 52 as illustrated in FIG. 3 or in any other desired region of the master film 30. Each time a blip is sensed by the blip detector 104, this information is used by the control system in combination with information received from the encoder roller 102 to accurately position image areas 50 in the processing stations along the master film strip processing path.

The master film strip 30 leaving the exposure station 36 travels through a second film clamp 106 and around a dancer roller 108 to the developing station 38 where a pair of rollers 110 and 112 support the film strip at opposite ends of the back up member 80. From the developing station, the master film strip 30 moves around a roller 114 to the duplication station 40, and then is guided by a roller 116 through a third film clamp 118 and by a final roller 121 to the take up spool 34.

A normal film tension, for example about five pounds, is maintained on the master film strip 30. Each time the film is advanced one step, the take up drive motor 96 is energized to pull the strip through the processing path. Supply drive motor 94 may also be energized to provide a predetermined drag. When the film has reached the desired position as determined by the blip detector 104 and/or the encoder roller 102, the film is stopped and film clamp 106 is moved from its open to its closed position accurately to locate the film adjacent the exposure station 36. After clamp 106 is closed, the take up and supply motors 96 and 94 are energized to apply the predetermined normal tension to the strip 30. Clamps 98 and 118 are then closed to maintain this tension independently of the motors 94 and 96. It will be understood that the above described film clamps 98, 106 and 118 engage the film at the guard bands 52 to avoid "pressure fogging" the image areas or abrading the emulsion or otherwise damaging an image area.

Since heat development of the master film strip 30 at the developing station 38 depends upon intimate contact of the developer shoe 70 against the film, it is desired that increased film tension be provided in this region. Dancer roller 108 engages a lever arm 122 mounted for pivoting movement about an axis 124. As the developer shoe 70 presses the film strip 30 toward the back up member 80, the dancer roller 108 moves to permit deflection of the film strip 30, and a spring 126 applies a force to the arm 122 sufficient to increase the tension to a higher value, for example on the order of approximately twelve pounds. This increased tension is isolated from the exposure station by the clamp 106 and does not have an adverse affect at the duplication station 40 due to the closed condition of the vacuum clamp 82.

The duplicate film strip 42 is supplied to the microimage recorder 20 in a cartridge 128. The duplicate film is preferably a high contrast vesicular film exposed by light, developed by heat and cleared by light. The duplicate film strip 42 is pulled from the cartridge 128 through a pair of film drive rollers 130. The strip 42 travels around a duplicate film dancer roller 134 and around an idler roller 136 to the duplication station 40 where it is maintained by vacuum in engagement with the belt 84 of the vacuum clamp 82. The duplicate film strip 42 leaves the duplication station 40 between the roller 88 and a roller 138.

Duplicate film 42 leaving the duplication station 40 is guided to the cutting station 44 including a knife member 140 that is moved by the motor 85. Individual image areas exposed onto the duplicate film strip at the duplication station 40 are cut from the end of the duplicate film strip 42 by the knife member 140 to form individual, discrete microfiche cards or records 24.

From the cutting station 44, individual records 24 are advanced by feed rollers 142 and 144 to the duplicate film developing station 46 where the records 24 are held against a rotating heated drum 146 by a roller-mounted pressure belt 148. The heated drum 146 is maintained at a predetermined temperature by the operation of a temperature controller 146A.

Developed microfiche records 24 leaving the developing station 38 are detected by a sensor 24A that provides a signal each time a record is detected, and are transferred by roller-mounted feed belts 150 and 152 to be deposited in the machine exit port 22. Exit port 22 in the illustrated arrangement is in the form of a tray or hopper easily accessible from the exterior of the housing 28. A sensor in the form of a switch 22A detects when the exit port 22 is full. Clearing station 48 is associated with the exit port 22 and includes a clearing lamp 159 that is operated by a clearing lamp control circuit 159A to apply a film clearing radiation to each completed microfiche record 24 as it reaches the exit port 22.

Either single or multiple microfiche records 24 may be made from each image area 50 of the master film strip 30. When multiple microfiche records 24 are made from a single developed image area 50 of the master film strip 30 at the duplication station 40, the master film strip 30 is not advanced and master film exposure and master film developing operations are not carried out between successive operations of the duplication station 40. A first image area is exposed on the duplicate film strip 42 at the duplication station, and the duplicate film strip is advanced to the position shown in FIG. 1 with the leading edge at the cutting station 44. While the first latent or undeveloped image area at the leading end of the duplicate film strip 42 is at this null position between the duplication station and the cutting station 44, the duplication station 40 is operated again to duplicate a second copy of the same image area 50 from the master film strip 30 onto the next adjacent region of the duplicate film strip 42. After the second exposure, the duplicate film strip is advanced one step to move the first exposed image area past the knife member 140 of the cutting station 44. This first exposed image area is severed from the end of strip 42, and is developed and cleared to provide a completed microfiche record 24. This sequence of operation is repeated without movement of the master film strip 30 until the desired multiple number of records are dupli- cated.

A longer time is required between operations of the duplication station 40 when the master film strip 30 is advanced and processed at the exposure station 36 and developing station 38. The image quality of exposed image areas on the duplicate film 42 is affected by the delay between exposure and development of the duplicate film 42. Consistent image quality is obtained by controlling the duplicate film travel to prevent extended delay as the master film strip 30 is advanced and processed.

More specifically, when single microfiche records 24 are made from each image area 50 of the master film strip 30, or when the last of a number of multiple records has been made, the duplicate film strip 42 is advanced one step following the duplication operation to place the exposed image area on the duplicate film strip 42 at the null position with the leading edge at the cutting station 44. The duplicate film strip is then advanced an additional step so that the exposed image has passed the cutting station and the exposed image area is properly positioned to be cut from the end of strip 42. Prior to cutting and development of the exposed image as a microfiche record 24, a delay period is provided equivalent to the time required for each duplication of multiple image areas from a single master film image area in order that consistent delay time and image quality are obtained. After the delay period, the exposed image area of the duplicate film is cut, developed and cleared.

When the exposed image is cut, an unexposed area resides in the null position of the duplicate film path between the duplication station 40 and the cutting station 44. Wastage of this unexposed area is avoided by reversing the travel of the duplicate film strip to retract the unexposed leading end of the duplicate film strip into the duplication station 40. The vacuum belt 84 is moved in the reverse direction to retract the duplicate film strip as described in patent application Ser. No. 788,283 referred to above.

Dancer roller 134 is mounted on an arm 154 pivoted at axis 156. The weight of the arm 154 causes the dancer roller 134 to take up slack in the duplicate film strip 42 when it is retracted. A pair of detectors in the form of switches 160 and 162 detect alternate extreme positions of the arm 154 and dancer roller 134. If duplicate film strip tension is lost as by breakage of the film strip 42, the arm 154 moves against switch 162 to provide a signal indicating a film break. Switch 160 controls the duplicate film strip drive rollers 130 to feed additional film strip 42 into the duplicate film strip path upon demand.

Figure 4:
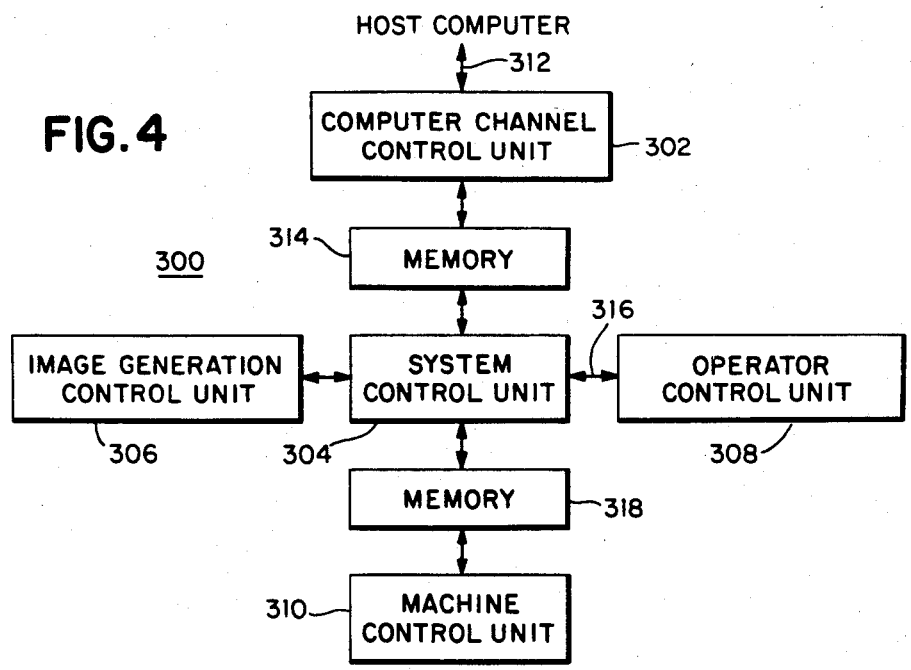
FIG. 4 is a block diagram representation of a control system of the present invention for use with the microimage recorder of FIG. 1.

Referring now to FIG. 4, there is illustrated a block diagram representation of the control system of the invention designated as a whole by the reference numeral 300. The control system 300 includes a computer channel control unit 302, a system control unit 304, an image generation control unit 306, an operator control unit 308 and a machine control unit 310. According to an important feature of the invention, a distributed control arrangement is utilized, and each of the control units 302, 304, 306, 308 and 310 includes at least one processor unit. A supervisory processor unit is employed in the system control unit 304 and includes a master application program for controlling the processor units in the computer channel control unit 302, the image generation control unit 306, the operator control unit 308 and the machine control unit 310 to enable the sequential operation of the microimage recorder 20.

The microimage recorder 20 may be used as a peripheral device to a host computer for producing microfiche cards 24 bearing an image pattern corresponding to output data received from the host computer. A bidirectional computer channel 312 enables transfer of output data in an Extended Binary Coded Decimal Interchange Code (EBCDIC) format from the host computer to the computer channel control unit 302. The EBCDIC output data includes image data and job set-up parameters indicating the number of copies to be produced, the run time and run date, eye-readable title text, framing and special graphics and indexing specifications. Reformatting of the received EBCDIC data to the American Standard Code for Information Interchange (ASCII) format is done by the computer channel control unit 302. A data packet consisting of a first data position command byte, a second data-length byte indicating the record size and the remaining bytes of imaging data is transferred from the computer channel control unit 302 to the system control unit 304 via a shared memory 314. Parallel ASCII data is transferred from the system control unit 304 to the image generation control unit 306 that generates a light image on the display of the projection CRT 26 corresponding to the received ASCII data.

A plurality of indicator lights, a display device for displaying error and status messages and a plurality of switches (not shown in FIG. 4) are used in the operator control unit 308 to enable operator intervention in the operation of and diagnostics for the microimage recorder 20. Data is transferred between the system control unit 304 and the operator control unit 208 via an asynchronous, bidirectional serial link at line 316.

Control of the various functions and operations of the electromechanical components of the microimage recorder 20 is provided by the machine control unit 310 in response to a sequence of predefined commands and parameters received from the system control unit 304. The machine control unit 310 monitors the operations and status of various components of the recorder 20 and provides operational status and error data to the system control unit 304. Communication between the machine control unit 310 and the system control unit 304 is enabled via a shared memory 318. A random access memory (RAM) advantageously may be used for the shared memory 318. The shared RAM 318 is arranged in the form of a plurality of defined data blocks with selected ones of the data blocks defined to be written to by the system control unit 304 and read by the machine control unit 310 and the remaining other data blocks defined to be written to by the machine control unit 310 and read by the system control unit 304. Each defined data block includes addressable storage locations for storing a predetermined number of bytes of data that are used according to a defined communications protocol for the data transfer between the system control unit 304 and the machine control unit 310.

Referring now to FIG. 5, there is illustrated a block diagram representation of the system control unit (SCU) 304 of the control system 300. A supervisory processor unit 320 may be an 8-bit data, 16-bit address microprocessor device such as a Zilog Z-80 microprocessor, however, various other commercially available microprocessors having standard capabilities can be used for the supervisory processor of the SCU 304. A control bus 322, a bidirectional data bus 324 and an address bus 326 enable communication between the microprocessor 316 and a plurality of associated memory devices including a program memory unit 328 that stores the master application program, an electronically erasable programmable read only memory EEPROM 330 that stores system parameters and status values, the shared memory 314, such as a dynamic random access memory (DRAM) and the shared RAM 318. The SCU 304 includes decode and refresh logic circuitry 332 coupled to the microprocessor 320 via the control bus 322 and the adress bus 326 for providing select signals at lines 334 and 336 to the DRAM 314 and EEPROM 330, respectively. An input/output (I/0) port decode logic 338 is coupled to the address bus 326 to provide I/0 port decoding within the SCU 304. The SCU 304 further includes programmable counter/timer logic circuitry 340 that may include, for example two Zilog integrated circuit CTC devices number Z8430A for providing counter and timer interrupts to the microprocessor 320.

A system clock generation logic circuit 342 provides a clock signal having a frequency of, for example, 3.6864 MHz to the microprocessor 320 and to the programmable counter/timer logic 340. A buffer/line driver logic circuit 344 is coupled to the data bus 324 and the address bus 326 for transferring the parallel ASCII data from the SCU 304 to the image control unit 306. A serial input/output (SIO) device 346, such as a Zilog integrated circuit SIO device number Z8440A is connected to the control bus 322, the data bus 324 and the address bus 326 to enable data transfer between the SCU 304 and the operator control unit 308 via the asynchronous, bidirectional serial link 316, for example at a 2400 baud rate, using an eight bit data packet including one start bit and one stop bit and even parity error checking. A second SIO 348 provides a serial input/output RS232 interface port for connecting a terminal device (not shown) for performing system diagnostics and modifying system parameters which may require adjustments during the life of the microimage recorder 20.

Referring to FIG. 6, there is illustrated a block diagram representation of the operator control unit 308 of the control system 300. The operator control unit 308 includes a processor unit 356 that may be the same type Zilog Z-80 microprocessor as is used in the SCU 304, associated memory devices including a read only memory ROM 358 for program storage and a random access memory RAM 360 for intermediate data storage all of which communicate with the microprocessor 356 via a bidirectional data bus 362 and an address and control bus 364. The operator control unit 308 includes a programmable counter/timer logic circuit 366, such as a Zilog integrated circuit CTC device Z8430A. A number of manually operable input switches 370 are coupled via input buffer logic 372 and data bus 362 to the microprocessor 356. The input switches 370 enable the user of the microimage recorder 20 to initiate predefined sequences such as later described purge and resume sequences. The input switches 370 may include an online switch, a start-up switch, a door access switch, a purge switch, a remote diagnostics switch, a master film remaining switch, a duplicate film remaining switch, a total copies switch, a review code switch, a resume switch and a change film switch.

An output buffer driver logic circuit 374 is coupled to the microprocessor 356 via the data bus 362 for driving a display 376, such as a six character, seven segment display to provide status and error messages for viewing by the user of the recorder 20, and for driving a plurality of indicator lights 378. The lights 378 may indicate various machine operating conditions such as online, ready, door open, print busy, copy busy and remote diagnostics.

A serial input/output SIO device 380, such as the Zilog integrated circuit device No. Z8440A is connected to the data bus 362 and to the address bus 364 to enable data transfer between the system control unit 304 through the asynchronous, bidirectional serial link 316, which may be, for example, a four-wire optically isolated serial link. An optical isolator device 382 is utilized to isolate the serial link 316 from the operator control unit 308. A system clock 384 provides a desired frequency such as 3.6864 MHz to the microprocessor 356, the SIO 380 and the programmable counter/timer logic 366.

Figure 7A:
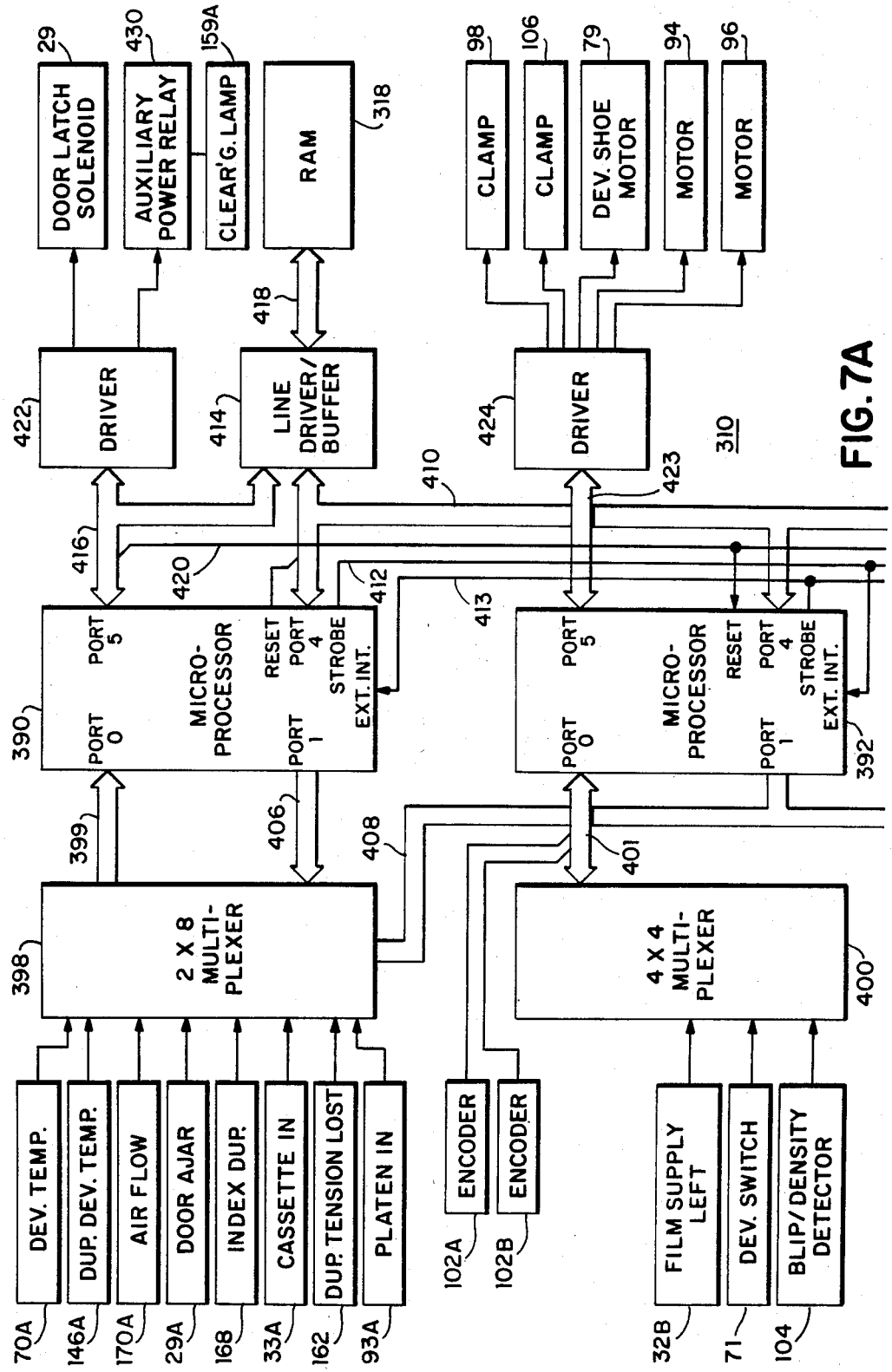
FIGS. 7A and 7B provide a partially schematic and block diagram representation of a machine control unit of the control system of FIG. 4.
Figure 7B:
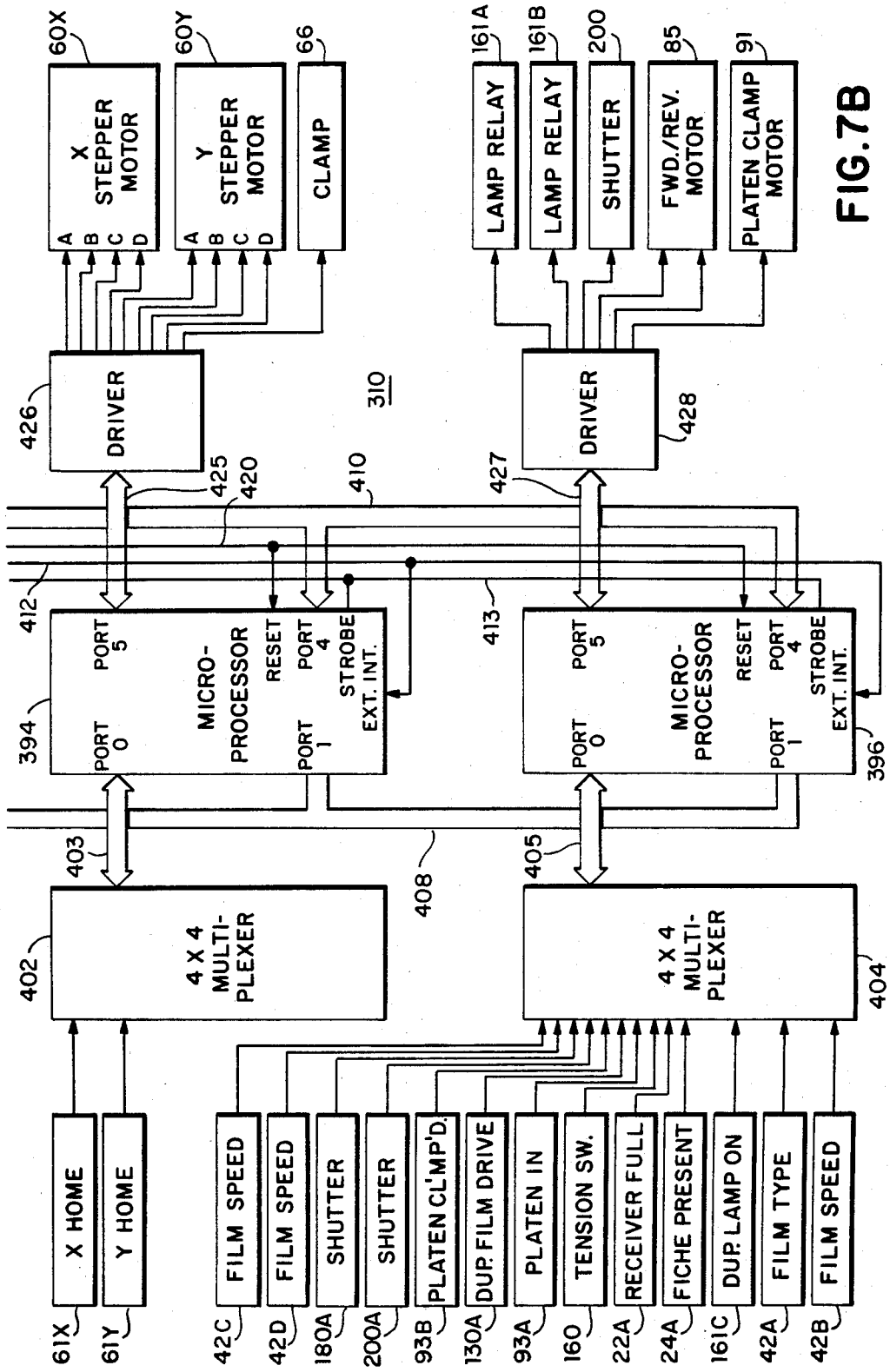

Referring now to FIGS. 7A and 7B, there is shown a block diagram representation of the machine control unit MCU 310 of the control system 300. The MCU 310 utilizes a distributed control arrangement including a master processor unit 390 and a plurality of slave processor units 392, 394 and 396. Various commercially available microprocessors having standard capabilities can be used to perform the functions of the processor units 390, 392, 394 and 396; however, a Mostek 3870/F8 microprocessor that includes 32 bidirectional lines with each line being useful as either a TTL compatible input or as a latch output, advantageously may be employed.

Each of the microprocessors 390, 392, 394 and 396 include four ports, with each port including eight bidirectional lines. The four ports are shown as Port 0, Port 1, Port 4 and Port 5. A crystal or clock (not shown) is connected to each of the microprocessors 390, 392, 394 and 396. The microprocessors further include a ready strobe output for valid Port 4 data shown as STROBE, an external interrupt input shown as EXT INT and an external reset input shown as RESET. An attached Appendix A provides an exemplary port bit arrangement for each of the microprocessors wherein the microprocessor 390 is referred to as main microprocessor (unit A), the microprocessor 392 is referred to as web processor (unit B), the microprocessor 394 is referred to as X-Y table processor (unit C) and the microprocessor 398 is referred to as the duplicator processor (unit D).

A multiplexer system including multiplexers 398, 400, 402 and 404 provides matrix data input bits for selected Port 0 lines to the microprocessors 390, 392, 394 and 396, respectively. Each of the multiplexers 398, 400, 402 and 404 may be provided by utilizing commercially available integrated circuit devices, such as two SN74LS138, one of eight decoders/demultiplexer integrated circuit devices sold by Motorola, Inc. The multiplexer 398 is arranged in the form of a 2×8 multiplexer providing eight matrix data input bits 0–7 to the Port 0 of the microprocessor 390 via a bus 399. The multiplexer devices 400, 402 and 404 are arranged in the form of 4×4 multiplexers to provide four matrix data input bits 0–3 to Port 0 of the microprocessors 392, 394 and 396 via a bidirectional bus 401, 403 and 405, respectively.

Each of the multiplexers 398, 400, 402 and 404 is coupled to detectors and sensors within the microimage recorder 20. The multiplexer 398 is coupled to the developer shoe temperature controller 70A, the duplicator developer temperature controller 146A, an air flow sensor 170A that detects air flow within the housing 92 to provide an air flow signal, the door ajar switch 29A, a manually operable input switch 168 that is provided within the housing 28 that provides a signal indicative of an operator initiate indexing of the duplicate film 42, the master film cassette installed switch 33A, the duplicator film tension lost switch 162 and a platen installed switch 93A that detects that the platen 93 is installed. The multiplexer 398 receives four control address lines 0–3 from the Port 1 output bits 4–7 from the microprocessor 390 at bus 406. Ready/Busy output bits from Port 1, bits 6–7 from each of the microprocessors 400, 402 and 404 are applied to the multiplexer 398 via a bus 408. The exemplary Port 0 matrix data input bits 0–7 of the microprocessor 390 are listed in the attached appendix A in the table entitled "Port A0 Input Matrix Data Table" including subheadings of Multiplexer A and Multiplexer B for the 2×8 multiplexer 398 functions.

The multiplexer 400 is coupled to various detectors and sensors that may include the film tension detector 32B, a developer shoe position sensor 71 and the blip/density detector 104. The multiplexer 400 provides four matrix data input bits to the Port 0 bit 0–3 of the microprocessor 392 via the bidirectional bus 401. The exemplary Port 0 matrix data input bits 0–3 of the microprocessor 392 from the 4×4 multiplexer 400 are listed in appendix A at page 5 in the table entitled "Port B0 input Matrix Table". The Port 0 input bits 6–7 of the microprocessor 392 are provided from the encoder 102 which includes A and B channel outputs 102A and 102B to indicate travel of the master film strip 30.

The multiplexer 402 is coupled to receive signals from sensors including the X home position sensor 61X and the Y home position sensor 61Y of the lens 60. The 4×4 multiplexer 402 provides four matrix input bits 0–3 to Port 0 of the microprocessor 394 via the bidirectional bus 403. Appendix A, at page 7 includes a table entitled "Port C0 input matrix table" that lists the exemplary Port 0 input matrix data bits 0–3 to the microprocessor 394 from the 4×4 multiplexer 402.

Input signals from sensors and detectors within the microimage recorder 20 are applied to the multiplexer 404. These sensors include the swinging shutter position sensor 180A, the sliding safety shutter position sensor 200A, a platen clamped position sensor 93B, a duplicate film drive sensor 91A, the platen installed sensor 93A, the duplicator tension switch 160, the receiver full sensor 22A, the fiche present sensor 24A, the duplicator lamp on sensor 161C, the film type sensor 41A and the film speed sensors 42B, 42C and 42D. The multiplexer 404 receives address output bits 0–2 from Port 0 of the microprocessor 396 and provides four matrix data input bits 0–3 to Port 0 of the microprocessor 396. The exemplary Port 0 matrix data input bits 0–3 to the microprocessor 396 from the 4×4 multiplexer 404 are listed in the attached appendix A at page 9 and the table entitled "Input matrix table Port D0".

A bidirectional data bus 410 connects the Port 4 input/output data lines of each of the microprocessors 390, 392, 394 and 396. The STROBE output of the microprocessor 390 provides an external interrupt input for each of the microprocessors 392, 394 and 396 via line 412. The STROBE output of each of the microprocessors 392, 394 and 396 provides an external interrupt input for the microprocessor 390 via line 413.

A line driver/buffer logic circuit 414 is provided for bidirectional communication between the MCU 310 and the SCU 304 via the shared RAM 318. The line driver/buffer logic circuit 414 is connected via the bidirectional data bus 410 to the Port 4 data bits 0-7 of each of the microprocessors 390, 392, 394 and 396. A bidirectional bus 416 is connected between the Port 5 of the microprocessor 390 and the line driver buffer logic circuit 414 for receiving an SCU acknowledge input bit to the microprocessor 390. RESET input is provided to the microprocessor 390 from the SCU 304 via the bus 410. An external RESET input is provided to microprocessors 392, 394 and 395 from a Port 5 output line of the master microprocessor 390 at line 420.

A driver circuit 422, 424, 426 and 428 receives output data bits from selected Port 5 output lines of the microprocessors 390, 392, 394 and 396, respectively, for controlling the electromechanical devices within the microimage recorder 20. The driver circuit 422 is connected to the microprocessor 390 via bus 416 and controls the door latch solenoid 29 and an auxiliary power relay 430 that energizes the duplicator lamp 161, the clearing lamp 159, the heaters for the developer shoe 70 and the duplicate developer roller 146, the vacuum motor for the vacuum clamp assembly 82 and that provides a high voltage potential to the CRT 26. The driver circuit 424 is connected to the microprocessor 392 via a bidirectional bus 423 and controls the operation of the clamp 98, clamp 106, the clamp 118, the developer shoe motor 79, the drive motor 91, the supply motor 94 and the take-up motor 96 for the master film strip and the dancer latch solenoid 120A. The driver circuit 426 is connected to the microprocessor 394 via a bidirectional bus 425 and separately provides four inputs A, B, C and D drive signals to the Y stepper motor 60Y and A, B, C, D drive signals to the X stepper motor 60X. The driver circuit 426 controls the operation of the aperture clamp 66. The driver 428 is connected to the microprocessor 396 via a bidirectional bus 427 and provides control signals to activate the lamp relay 161A, the lamp relay 161B, the shutter 200A, and forward and reverse operation of the duplicator drive motor 91.

Figure 8B:
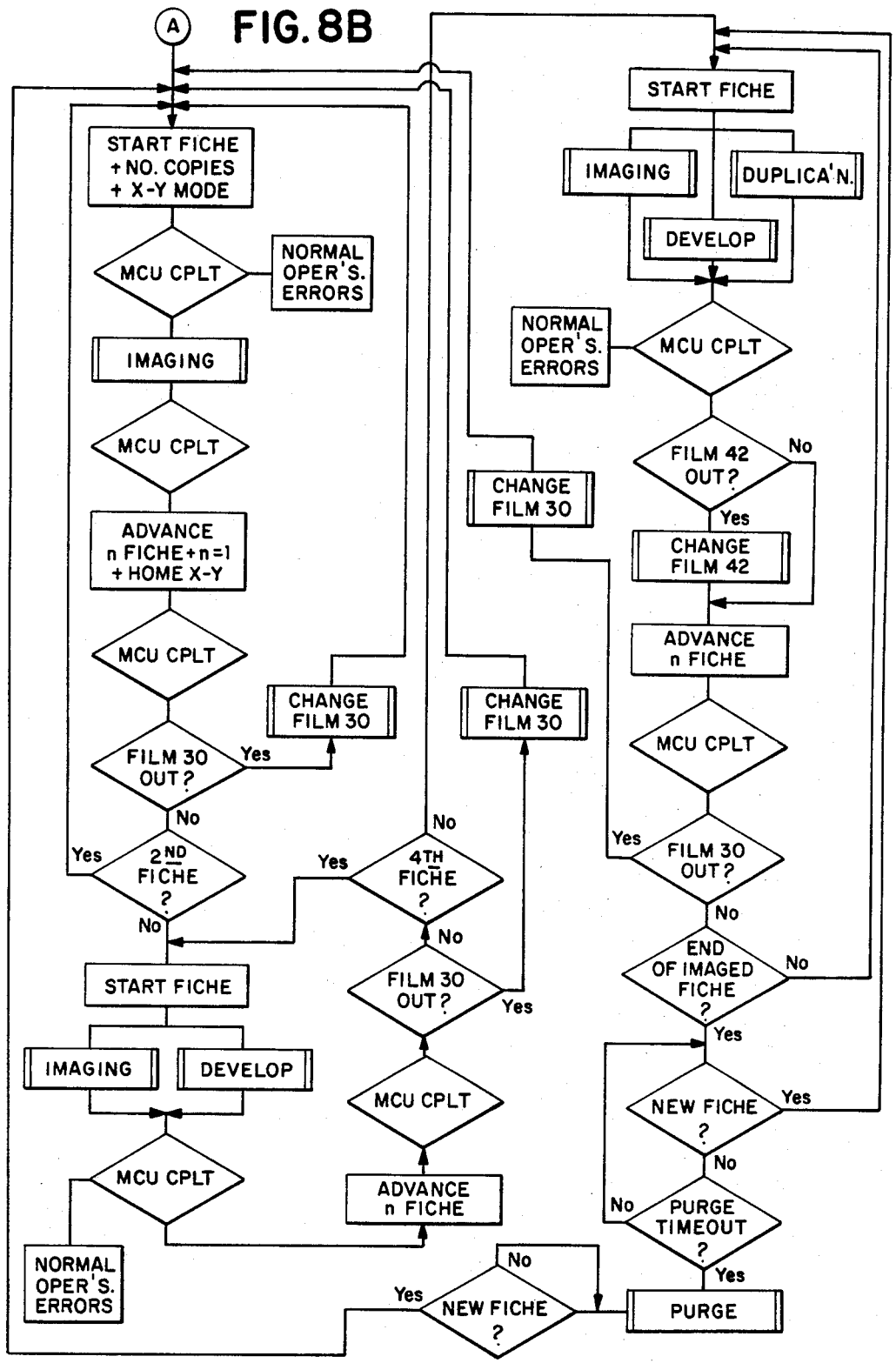

Referring now to FIGS. 8A-8B, there is shown a flow chart illustrating the logical operations performed by the SCU 304. Referring first to FIG. 8A, initially the power to the microimage recorder is off. The operator of the microimage recorder 20 moves a main power circuit breaker (not shown) to an on position and power is applied to a cooling fan (not shown) and the control system 300. The power-up sequence begins with the SCU 304 writing an Initialize command and setting a normal command bit in the shared RAM 318. The MCU 310 polls the normal command bit, decodes the Initialize command and the microprocessors 390, 392, 394 and 396 execute power-up initialization routines and mechanical status of the control devices are detected. During the initialization, the master machine microprocessor 390 reads parameter data from the shared RAM 318 including a fiche advance adjust parameter that indicates the number of counts to be added or subtracted from the final desired position following each advance of the master film 30, a duplicate exposure adjust parameter that indicates any adjustment for the duplicator exposure time and two master developer adjust parameters that indicate any adjustment to either the master developer dwell time and/or cooling delay time for each master fiche made. The MCU 310 advances the master film 30 until unexposed film a predefined number of fiche past the last blip imaged is over the exposure station 36. Then the MCU 310 transmits a command completed acknowledge to the SCU 304 and waits for the next SCU command.

If any power-up errors are detected by the MCU 310, appropriate error data is sent to the SCU 304 with the command completed acknowledge to enable appropriate error correction sequential operations. The sequential operations for error corrections are illustrated in FIG. 8A starting at an entry point labelled ERROR.

The MCU 310 can transfer error condition data with the command completed acknowledgement to the SCU 304 at any time during the sequential operations of the microimage recorder 20. The SCU 304 executes an error sequence shown at an entry point labelled ERROR in FIG. 8A, starting with the transfer of the particular error message to the operator control unit 308 for displaying an appropriate error message for viewing by the operator. The SCU 304 decodes the error data received from the MCU 310 and determines the error type. For a first type of error including certain mechanical failures detected during the startup sequence such as no film movement or no air flow detected by sensor 170A, the MCU 310 disables the duplicator index switch 168, deenergizes the auxiliary power relay 416, opens the master film clamps 98, 106 and 118.

For a second error type, such as loss of tension detected by switch 160 for the duplicate film 42, the SCU sends a Door Access command to the MCU 310 responsive to the activation of the door access input switch 370 by the operator. The MCU 310 activates the door unlatch solenoid 29 to enable the operator to correct the particular error. The MCU 310 transmits a command completed acknowledge when the door sensor 29A indicates the door 29 is ajar. When the operator closes the door the MCU 310 sends a door closed message together with any data indicating error conditions that then exist. If the original error is not corrected or if a new error condition exists, the error sequence is repeated. When the SCU 304 receives the door closed message from the MCU 310 without error parameters, the SCU 304 sends a Resume command to the MCU 310 responsive to the activation of the resume input switch 370 by the operator. The MCU 310 continues with the sequential operations that were being performed when the error condition was detected. A third error type such as the receiver tray 22 being detected as full by sensor 22A may be corrected by the operator without requiring access to the interior of the microimage recorder 20. The SCU 304 sends a resume command in response to an activation of the resume input switch 370 by the operator. The MCU 310 continues the sequential steps being performed prior to the particular detected error.

The operator of the microimage recorder 20 initiates the start-up sequence by activating a startup input switch 370 and then the SCU 304 transmits a Start-up command to the machine control unit 310. In response to the Start-up command, the machine control unit 310 detects the status of a number of controlled devices within the microimage recorder and transmits the status and error message to the SCU 304 including, for example, if the door is ajar or if the platen 93 is in the clamped position. If start-up errors are transmitted by the MCU, an appropriate error sequence is performed as above described. Otherwise for normal operation, the MCU transmits a command completed acknowledge signal to the SCU 304. Then the MCU 310 enables an auxiliary power relay 430 that energizes the duplicator lamp 161, the clearing lamp 159, the heaters for the developer shoe 70 and the duplicate developer roller 146, the vacuum motor for vacuum clamp assembly 82 and provides a high voltage potential to the CRT 26.

Sequential start-up steps continue with the MCU 310 automatically indexing the duplicator station 38 to initialize it mechanically. Following, the duplicator lamp 161 is energized to a high power level for a predetermined time period, for example ten minutes. The MCU 310 energizes the duplicator lamp 161 to a maintenance or normal power level. The startup sequence continues with the MCU 310 performing the functions of retracting the duplicate film 42 by one fiche if the film 42 was left extended at the previous shut down, moving the vacuum clamp assembly 82 to a clamped position with the platen 93 which opens the safety shutter 180, opening the swinging shutter 200 for a predetermined time and detecting that the duplication lamp 161 is on while the shutter 200 is open. Then the vacuum clamp assembly 82 is lowered to a non-clamping position with the platen 93, the duplicate film 42 is advanced two full cycles and the knife 140 is activated to cut the fiche 24 that is sensed by the sensor 24a at the exit port 22. The SCU 304 reads the shared RAM 318 for any status and error data provided by the MCU 310.

Figure 8E:
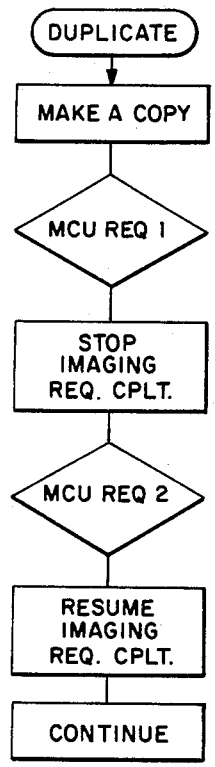

Next the SCU 304 determines when a film initialization sequence is required during the startinitialization up sequential steps. The film initialization sequence is performed after new master film 30 is installed and at periodic time intervals to compensate for variations in the film 30, the CRT 26 and the optics assembly 58. Also the film initialization sequence is required, for example, when an indexing blip is not detected, fogged film 30 is detected or the door 29 is open at an incorrect time during the sequential operations of the recorder 20. The film initialization sequence is illustrated in FIG. 8H starting at an entry point labelled FILM INITIALIZATION and is later described. When the film initialization is completed without any detected film input errors and when film initialization is not required, the SCU 304 responds with a system ready indication enabling the start of the normal operating sequence. The normal operating sequence is enabled following an end-of-purge, an end-of-start-up, an end-of-new film or an end-of-a door access sequence.

Referring now to FIG. 8B, the normal operating sequence begins shown at an entry point labelled A. Starting conditions for normal operations include unexposed master film 30 over the CRT 26, the X-Y positioner 64 in the home position, the aperture clamp 66 opened, the master film strip 30 under tension with the film clamps 98, 106 and 118 closed, the developer shoe 70 up, the duplication platen 93 unclamped or open, the shutter 200 closed and the duplication lamp 161 warmed up and providing a low light level. The SCU 304 has stored job set-up parameters that were provided by the host computer. The normal operating sequence begins with the SCU 304 writing a Start Fiche command, a first parameter defining the number of copies indicated in the job set-up parameters by the host computer, and a second parameter defining the operation mode of the X-Y positioner 64 and setting the normal command bit. The MCU 310 polls the normal command bit, decodes the Start Fiche command and parameters. Responsive to the Start Fiche command, the MCU 310 closes the aperture clamp 66, sets the X-Y mode indicated and transfers the number of duplicate copies to be made to a developer queue input and notifies the SCU 304 by setting the command complete bit after a predetermined time delay, for example, 300 milliseconds.

An imaging sequence is performed as is illustrated and is now described with reference to FIG. 8C. A blip is drawn on the master film strip 30. The SCU 304 provides an Advance X-Y to the Next Page command to begin the imaging sequence. In response to the Advance X-Y to Next Page command, the MCU 310 opens the aperture clamp 66, moves the X-Y positioner 64 to the next page, sets a defined step or index and closes the aperture clamp 66. Following the predetermined time delay, the MCU 310 transmits the command completed acknowledge to the SCU 304 and waits for the next SCU command. An image is exposed on the film 30 and the SCU 304 repeats the Advance X-Y to Next Page command until all data pages are imaged onto the image area No. 1 that corresponds to a first fiche.

The imaging sequence continues with an Advance X-Y to first Fiche Index Page command and a parameter indicating the number of fiche index pages transferred by the SCU 304 to the MCU 310. The Advance X-Y to Next Page command and the responsive steps performed by the MCU 310 are repeated until all fiche index pages are imaged. Then the SCU 304 transmits an Advance X-Y to first Eye Readable command and repeats the Advance X-Y to Next Page and Advance X-Y to first Fiche Index Page commands until all eye readable data has been imaged.

Upon completion of the imaging steps for the first fiche, the master film 30 is moved by one fiche and the X-Y positioner 64 is moved to the home position by the MCU 310 in response to an SCU command Advance n Fiche where n is set equal to one. Then the SCU 304 checks the supply of master film 30 as indicated in FIG. 8B.

The change film 30 sequence will now be described with reference to FIG. 8G. When the SCU 304 detects an out of master film 30 condition, the SCU 304 sends data to the operator control unit 308 for displaying an out of master film message for viewing by the operator. Then the operator activates the door access input switch 370. The SCU 304 initiates a purge sequence to produce the required number of copies of fiche records 24 of the present imaged fiche at the exposure station 36. The purge sequence, shown within dashed lines in FIG. 8G and starting at an entry point labelled PURGE, begins with the SCU 304 sending a Start Fiche command to the MCU 310. In response, the MCU closes the aperture clamp 66 and the later described develop and duplicate sequences are started to develop and duplicate any unprocessed film at the stations 38 and 40. The MCU 310 acknowledges with command completed to the SCU 304 and a blip is imaged on the master film 30. The SCU 304 sends an Advance n Fiche where n equals 1 to the MCU 310 and the MCU executes the Advance n Fiche command when the current develop and duplicate sequences are completed and then the MCU 310 sends a command completed acknowledge to the SCU 304. The SCU 304 sends a Purge command and the MCU 310 executes the Purge command by performing the develop sequence, performing the duplicate sequence and then advancing the master film 30 by 1 fiche. The develop sequence, duplicate sequence and advancing film 30 by 1 fiche are repeated and then the duplicate sequence is performed. The master film 30 is advanced again by 1 fiche and the duplicate sequence then is repeated. The master film 30 is retracted by 2 fiche. The MCU 310 then sends a command completed acknowledge to the SCU 304 which completes the purge sequence.

Following the completion of the purge sequence, the SCU 304 transmits a Rewind command. The MCU 310 rewinds the master film strip 30 and the clamp 98 is closed on the film leader and a command completed acknowledge is sent to the SCU 304. The SCU 304 sends a door access command and the MCU 310 responds by activating the door unlatch solenoid 29 to allow the operator to load a new cassette of master film 30. Once the door sensor 29A indicates the door 29 is ajar, the MCU 310 sends a command completed acknowledge to the SCU 304. After the operator loads the new master film 30, the operator removes, cleans and replaces the platen 93, and manually tensions the spliced area of the master film 30. After the operator closes the door to the microimage recorder 20, the MCU 310 opens the left and right web clamps 98 and 118, tensions the master film 30 to ensure both a proper splice and proper manual tensioning of the film 30, monitors the supply spindle motion sensor 32A for excessive rotation indicative of low tension or a faulty splice, and sends a door closed message and any error data to the SCU 304. Following a normal door closed message from the MCU 310, the SCU 304 sends a Start Film Initialization command to the MCU 310 and the later described film initialization sequence is performed.

Referring again to FIG. 8B, the sequential steps for imaging, starting at an entry point labelled Imaging (FIG. 8C) are repeated until the second fiche is exposed. After the second fiche is exposed, the master film strip is advanced another fiche to position the third fiche at the exposure station 36. Again the supply of master film 30 is determined by the SCU 304 and the change film 30 sequence (FIG. 8G) is performed when necessary. Next with the third fiche at the exposure station 36, the sequential imaging steps are repeated and the third fiche area of film strip 30 is exposed.

While the third fiche is exposed according to the the above described sequential imaging steps, the first fiche may be developed, shown at an entry point labelled Develop in the FIG. 8D. The develop sequence will now be described with reference to FIG. 8D. The develop sequence begins with a Develop a Fiche command being transferred by the SCU 304 to the MCU 310. In order to prevent blurring of the image from vibration of the master film 30, the MCU transmits a stop imaging request shown as MCU REQ1 and the SCU 304 acknowledges by transferring a stop imaging request completed bit to the MCU 310. Then the developer shoe 70 is lowered against the film and a software developer timer is started to provide, for example, 19 seconds for developing the fiche. The MCU 310 sends a resume imaging request shown as MCU REQ2 after a predetermined elapsed time following the lowering of the developer shoe 70. The SCU 304 responds with a resume imaging request completed acknowledgement and allows the image generation unit 206 to resume generation of light images on the display of the projection CRT 26. Following the completion of both imaging of the third fiche and developing the first fiche, the SCU 304 transmits an Advance n Fiche command with n equal to 1 and a home X-Y parameter to the MCU 310. Again the supply of master film 30 is determined by the SCU 304 and the change film 30 sequence (FIG. 8G) is performed when necessary. Next with the fourth fiche at the exposure station 36, simultaneously the sequential imaging steps are repeated for the fourth fiche and the sequential developing steps are repeated for the second fiche.

Next the SCU 304 transmits an Advance n Fiche command where n equals 1 to the MCU 310 to present the fifth fiche at the exposure station 36. The MCU 310 moves the master film 30 by one fiche, becomes the X-Y positioner, and transmits a command completed acknowledgement to the SCU. Again the supply of master film 30 is determined by the SCU 304 and the change film 30 sequence (FIG. 8G) is performed when necessary. Now the sequential exposure, developing and duplicating steps may occur simultaneously for the fifth, third and first fiche. The duplication sequence begins at an entry point labelled DUPLICATE in FIG. 8E and is now described with reference to FIG. 8E.

Duplication of the first fiche and the duplication sequence begins with the SCU 304 transmitting a Make a Copy command to the MCU 310. In order to prevent interference with the exposure operation due to movement of the vacuum clamp 82, the MCU transmits a stop imaging request (MCU REQ 1) to the SCU 304. The SCU 304 responds with a stop imaging request completed acknowledge and the imaging sequence is interrupted.

Then, the MCU performs the following operations including reversing the drive motor 85 one full cycle to retract the duplicate film strip 42, clamping the platen 93 against the master film strip 307 and the duplicate film strip 42, opening the sliding shutter 200, opening the swinging shutter 180, waiting for a swinging shutter 180 open signal and simultaneously starting a vibration timer and starting the software exposure timer. The duplication lamp 161 is energized by operating both relays 161A and 161B at a high power level, for example 500 watts to provide a high light intensity output.

After the vibration timer times out, the MCU 310 sends a resume imaging request (MCU REQ 2) to the SCU 304. The SCU 304 acknowledges with a resume imaging request completed and allows the sequential imaging steps to be continued. After the predetermined exposure time period, the duplication lamp 161 is provided with the normal maintenance power level, for example 250 watts, and the swinging shutter 200 is closed a predetermined time thereafter allowing the lamp 161 to dim to the low light level. When the sensor 200A provides a signal that the shutter 200 is closed, the platen 93 and master film 30 and duplicate film 42 are unclamped. The duplicate film strip 42 is advanced one fiche. After a predetermined time delay the duplicate fiche is cut by activating the knife member 140 to form the individual microfiche 24. Then the SCU 304 checks the supply of duplicate film 42 after the duplication sequence is completed.

Figure 8F:
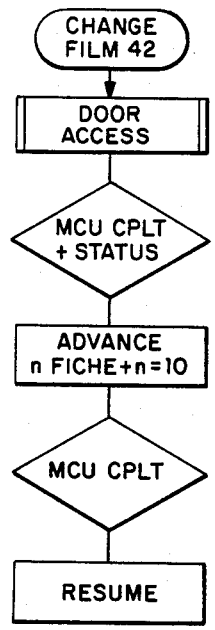
Figure 8G:
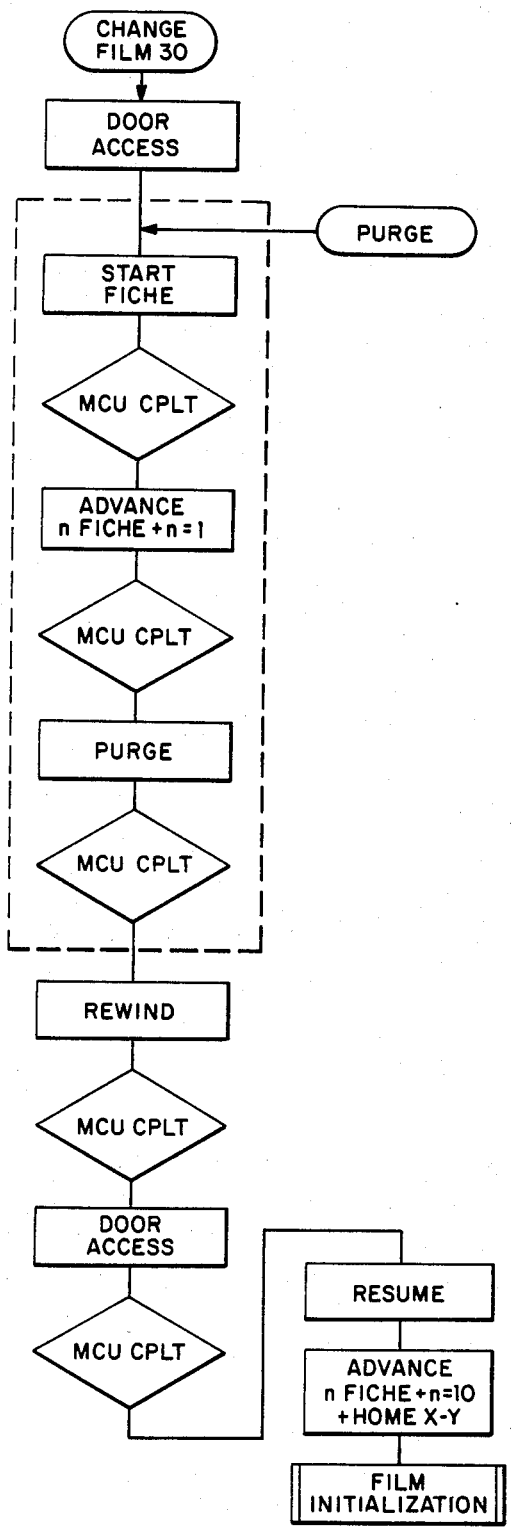
Figure 8H:
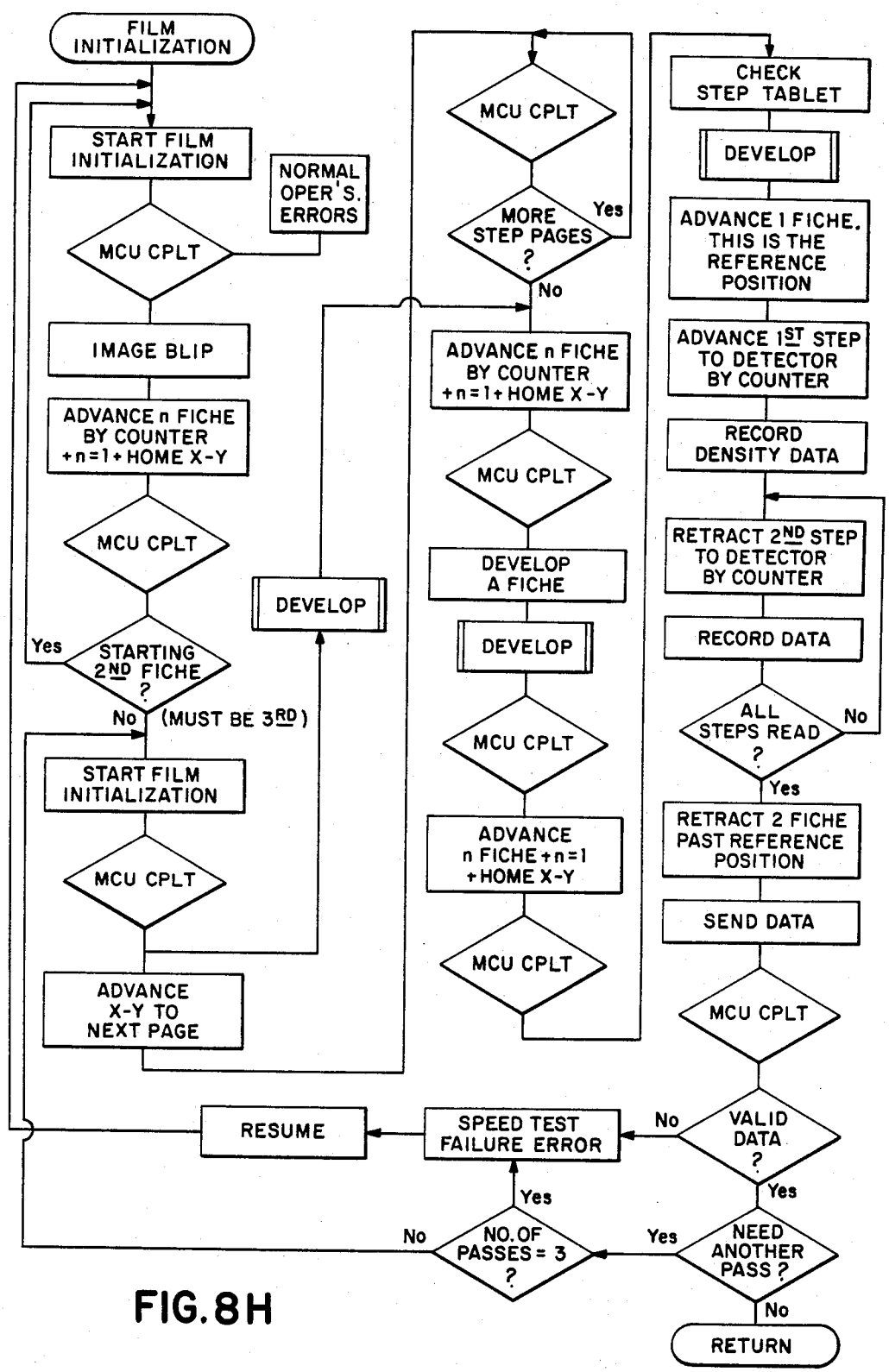

Referring now to FIG. 8F, the change film 42 sequence will now be described. When the SCU 304 detects an out of duplicate film 42 condition, the SCU 304 sends corresponding data to the operator control unit 308 for displaying an out of duplicate film message for viewing by the operator of the microimage recorder 20. The operator activates the door access input switch 370 and a Door Access command is transmitted by the SCU 304 to the MCU 310 to enable the operator to install a new cartridge of duplicate film 42. The MCU 310 energizes the door unlatch solenoid 29 and the operator loads the new cartridge of duplicate film 42 and advances the film manually using the dancer arm switch 160 to control the drive rollers 130 to feed additional film strip 42 into the duplicate film strip path. The operator closes the door and the MCU 310 reports the door closed status and any errors that have occurred while the door was opened with the command completed acknowledge bit to the SCU 304. The SCU 304 sends an Advance In Fiche command with n equal to 10. The MCU 310 completes the command by advancing the master film 30 by 10 fiche and transmits a command completed acknowledge to the SCU 304.

Sequential operations resume following the change film 42 sequence with the SCU 304 sending an Advance n Fiche command, as illustrated in FIG. 8B. The MCU 310 repeats the sequential duplication steps until all duplicates for the current master fiche are produced.

After the last image fiche has been duplicated, the SCU 304 waits for the start or continuation of a job in an idle state. After a predetermined elapse of time, the before-described purge sequential operations (FIG. 8G within dashed lines) are performed and the SCU 310 returns to the idle state.

In accordance with an important feature of the invention, the film initialization sequence is now described in detail with reference to FIG. 8H. As described above with reference to FIG. 8A, the film initialization sequence is periodically performed as part of the sequential start-up operations and following certain detected errors.

The film initialization sequence begins with the SCU 304 writing a Start Film Initialization command to the MCU 310. Responsive to the Start Film Initialization command, the MCU 310 closes the aperture clamp 66, transmits a command completed acknowledge and then a blip is drawn on the master film 30. Next, the SCI 304 provides an Advance n Fiche by Counter command where n is set equal to one and home X-Y parameter data. The MCU 310 opens the aperture clamp 66 and advances the master film 30 by counting to provide the images blip at the null position. Now with the second fiche at the exposure station 36, these steps are repeated to provide a second blip on the master film 30 and then to present the image area No. 3 on third fiche to the exposure station.

Next the SCU 304 again repeats the Start Film Initialization command and the MCU 310 closes the aperture clamp 66, transmits a command completed acknowledge and then a third blip is drawn on the third fiche. The first blip is then developed as before described with reference to FIG. 8D. Imaging of the third fiche continues with an Advance X-Y to the Next Page command provided by the SCU 304. In response the MCU 310 opens the paerture clamp 66, moves the X-Y positioner 64 to the page for the first step tablet position and closes the aperture clamp 66.

A first step tablet page is drawn on the master film 30 with the CRT 26 adjusted to a first intensity level within a predefined maximum range of intensities. The SCU 304 repeats the Advance X-Y to the Next Page command and the MCU 310 performs the responsive operations until a predetermined plurality of step tablet pages are drawn. Each of the step tablet pages is drawn with a different predefined intensity level adjustment of the CRT 26 within the predefined maximum range of intensities.

After the predetermined plurality of step tablet pages are drawn on the third fiche, the SCU 304 provides an Advance n Fiche by Counter command where n is set equal to one and home X-Y parameter data. The master film 30 is advanced one fiche by the MCU 310 to place the first blip at the second null position, the second blip at the developer station 36 and the third blip and the first step tablet at the first null position. Next the SCU 304 provides the Develop a Fiche command to start the develop sequence to develop the second blip. The develop sequence as before described (FIG. 8D) for the second fiche.

Movement of the master film 30 is now accomplished utilizing the developed blips as in the normal operating sequence. The SCU 304 sends an Advance n Fiche command where n is set equal to one and home X-Y parameter data to the MCU 310. The MCU 310 moves the master film 30 to provide the third blip and the first step tablet at the developer station 38. The develop sequence is again repeated for the third blip and the first step tablet.

After this develop sequence is completed, the master film 30 is moved one fiche by the MCU 310 responsive to the Advance n Fiche command provided by the SCU 304. This places the third blip and first step tablet at the second null position (FIG. 3) which is a reference position for the film initialization sequence.

Each step tablet page of the first step tablet is moved past the density sensor and the density of each is measured and recorded by MCU 310. The MCU 310 then retracts the master film 30 to again place the third blip and first step tablet at the second null or reference position.

After all the step tablet pages are measured and recorded, the master film 30 is retracted by two fiche by the MCU 304 by counting to place the third blip and step tablet at the first null position. The MCU 304 sends the density data for each of the step tablet pages to the SCU 310.

A range of acceptable detected densities are determined by the SCU 304 from the density data sent by the MCU 310. The SCU 304 compares the detected density data to predetermined minimum and maximum acceptable density values to identify density data within the acceptable range. Intensities of the CRT 26 resulting in the acceptable detected density data are identified by the SCU 304. A minimum intensity and a maximum intensity of the thus identified CRT intensities are then determined. A second step tablet is drawn on the master film at the exposure station 36 utilizing a dynamically determined range of CRT intensities between the minimum and maximum CRT intensities determined from the first step tablet. The above-described film initialization sequential steps are then repeated for the second step tablet.

Then the SCU 304 determines if a third step tablet should be drawn utilizing the detected density data from the second step tablet. The SCU 304 calculates an average intensity value of the acceptable detected density data of the last step tablet drawn. The intensity of the CRT 26 is then set equal to this calculated average intensity value.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

APPENDIX A

| MAIN PROCESSOR (UNIT A) | | | |
|---|---|---|---|
| PORT-BIT | FUNCTION | I/O | COMMENTS |
| A0-0 | MATRIX DATA BIT 0 | I | SEE |
| A0-1 | MATRIX DATA BIT 1 | I | TABLE |
| A0-2 | MATRIX DATA BIT 2 | I | BELOW |
| A0-3 | MATRIX DATA BIT 3 | I | FOR |
| A0-4 | MATRIX DATA BIT 4 | I | FUNCTION |
| A0-5 | MATRIX DATA BIT 5 | I | ASSIGNMENT |
| A0-6 | MATRIX DATA BIT 6 | I | |
| A0-7 | MATRIX DATA BIT 7 | I | |
| A1-0 | ADDRESS LINE 0 | O | ) BYTE |
| A1-1 | ADDRESS LINE 1 | O | ) SELECT |
| A1-2 | ADDRESS LINE 2 | O | ) ADDRESS |
| A1-3 | WRITE ODD BLOCK | O | [odd/even page] |
| A1-4 | CONTROL ADDRESS LINE 0 | O | } PAGE |
| A1-5 | CONTROL ADDRESS LINE 1 | O | } SELECT |
| A1-6 | CONTROL ADDRESS LINE 2 | O | } ADDRESS |
| A1-7 | CONTROL ADDRESS LINE 3 | O | } BITS |
| A4-0 | DATA LINE 0 | I/O | |
| A4-1 | DATA LINE 1 | I/O | |
| A4-2 | DATA LINE 2 | I/O | |
| A4-3 | DATA LINE 3 | I/O | |
| A4-4 | DATA LINE 4 | I/O | |
| A4-5 | DATA LINE 5 | I/O | |
| A4-6 | DATA LINE 6 | I/O | |
| A4-7 | DATA LINE 7 | I/O | |
| A5-0 | SCU ACKNOWLEDGE | I | |
| A5-1 | SELF TEST SWITCH | I | |
| A5-2 | SELF TEST INDICATOR 1 | O | |
| A5-3 | SELF TEST INDICATOR 2 | O | |
| A5-4 | spare | O | |
| A5-5 | RESET PROCESSORS B and C and D | O | |
| A5-6 | DOOR LATCH SOLENCID | O | |
| A5-7 | AUXILLARY POWER ON | O | |
| STROBE | Data STROBE | O | |
| EX INT | Communications ACK | I | |
| RESET | From POR, SCU, and Switch | I | |

| PORT A0 INPUT MATRIX DATA TABLE | | | | |
|---|---|---|---|---|
| ADDRESS A1- BIT 7 6 5 4 | | DATA A0- | | |
| LOGIC | LEVEL | BIT | FUNCTION | COMMENTS |
| | | | ←MULTIPLEXER "A"→ | |
| 1001 | 0110 | 0 | Web DEVELOPER HEATER SENSE ON | |
| / | / | 1 | Duplicator DEVELOPER SENSE ON | |
| : | : | 2 | AIR FLOW ON | |

APPENDIX A-continued

|   |   |   |   |
|---|---|---|---|
| : | : | 3 | DOOR AJAR |
| : | : | 4 | INDEX DUPLICATE |
| : | : | 5 | MASTER CARTRIDGE PRESENT |
| : | : | 6 | DUP TENSION LOST |
| / | / | 7 | GLASS FLAT INSTALLED |
|   |   |   | ←MULTIPLEXER "B"→ |
| 1000 | 0111 | 0 | UNIT B READY/BUSY 0 (WEB) |
| / | / | 1 | UNIT B READY/BUSY 1 (WEB) |
| : | : | 2 | UNIT C READY/BUSY 0 (X-Y TABLE) |
| : | : | 3 | UNIT C READY/BUSY 1 (X-Y TABLE) |
| : | : | 4 | UNIT D READY/BUSY 0 (DUPLICATOR) |
| : | : | 5 | UNIT D READY/BUSY 1 (DUPLICATOR) |
| : | : | 6 | DENSITY #1 (Same signal as in WEB) was spare |
| / | / | 7 | DENSITY #2 (Same signal as in WEB) was spare |

DENSITY TRUTH TABLE

| DENSITY SIGNAL | | | | |
|---|---|---|---|---|
| LOGIC | | LEVEL | | |
| #1 | #2 | #1 | #2 | FILM DENSITY STATE |
| 0 | 0 | 1 | 1 | UNDER MINIMUM DENSITY |
| 1 | 0 | 0 | 1 | ACCEPTABLE RANGE |
| 1 | 1 | 0 | 0 | OVER MAXIMUM DENSITY |
| 0 | 1 | 1 | 0 | NOT POSSISLE (HARDWARE FAULT) |

KEY
"—" = STATE DEPENDS ON NUMBER WANTED
"X" = DON'T CARE. NOT USED FOR THE DESCRIBED FUNCTION
"0" = LOGIC ZERO. DESIGNATED BIT HAS ACTIVE ROLL IN DEFINING THE FUNCTION
"1" = LOGIC ONE. DESIGNATED BIT HAS ACTIVE ROLL IN DEFINING THE FUNCTION

PORT A1 FUNCTION TABLE

| LOGIC STATE: BIT | | | | | | | | SOFTWARE | |
|---|---|---|---|---|---|---|---|---|---|
| 7 | 6 | 5 | 4 | 3 | 2 | 1 | 0 | HEX CODE | FUNCTION |
|   |   |   |   |   |   |   |   |   | A COMPLETE INSTRUCTION TO READ OR WRITE DATA THROUGH THE MCU/SCU SHARED RAM REQUIRES A COMBINENATION OF "PRT REQ", "READ" OR "WRITE" AND THE "BYTE ADDRESS". EX. READ BLOCK 0, BYTE 7:17 HEX |
| 0 | 0 | 0 | 1 | X | X | X | X | 1X | PRT REQ 0 (SCU DATA BLOCK 0) |
| 0 | 0 | 1 | 0 | X | X | X | X | 2X | PRT REQ 1 (SCU DATA BLOCK 1) |
| 0 | 0 | 1 | 1 | X | X | X | X | 3X | PRT REQ 2 (SCU DATA BLOCK 2) |
| X | X | X | X | 0 | — | — | — | X0-X7 | READ DATA BYTE 0 THRU 7 /ADDRESS |
| X | X | X | X | 1 | — | — | — | X8-XF | WRITE DATA BYTE 0 THRU 7  BITS 2,1,0 |
| 0 | 1 | 0 | 0 | X | X | X | X | 4X | WRITE ENABLE WEB PROCESSOR (UNIT B) |
| 0 | 1 | 0 | 1 | X | X | X | X | 5X | WRITE ENABLE X-Y PROCESSOR (UNIT C) |
| 0 | 1 | 1 | 0 | X | X | X | X | 6X | WRITE ENABLE DUP PROCESSOR (UNIT D) |
| 1 | 0 | 0 | 0 | X | X | X | X | 8X | ENABLE MULTIPLEXER "B" (READY/BUSY) |
| 1 | 0 | 0 | 1 | X | X | X | X | 9X | ENABLE MULTIPLEXER "A" (SENSORS) |
| 0 | 0 | 0 | 0 | X | X | X | X |   | spare (POWER-UP STATE) |
| 0 | 1 | 1 | 1 | X | X | X | X |   | spare |
| 1 | 0 | 1 | 0 | X | X | X | X |   | spare |
| 1 | 0 | 1 | 1 | X | X | X | X |   | spare |
| 1 | 1 | 0 | 0 | X | X | X | X |   | spare |
| 1 | 1 | 0 | 1 | X | X | X | X |   | spare |
| 1 | 1 | 1 | 0 | X | X | X | X |   | spare |
| 1 | 1 | 1 | 1 | X | X | X | X |   | spare |

WEB PROCESSOR (UNIT B)

| PORT-BIT | FUNCTION | I/O | COMMENTS |
|---|---|---|---|
| B0-0 | MATRIX DATA BIT 0 | I | SEE TABLE |
| B0-1 | MATRIX DATA BIT 1 | I | BELOW |
| B0-2 | MATRIX DATA BIT 2 | I | FOR BIT |
| B0-3 | MATRIX DATA BIT 3 | I | FUNCTIONS |
| B0-4 | ADDRESS BIT 0 | O |  |
| B0-5 | ADDRESS BIT 1 | O |  |
| B0-6 | POSITION ENCODER B (CALLED 'A' IN PRGM) | I | GOES LOW FIRST |
| B0-7 | POSITION ENCODER A (CALLED 'B' IN PRGM) | I |  |
| B1-0 | spare | O |  |
| B1-1 | spare | O |  |
| B1-2 | spare | O |  |
| B1-3 | BLIP DETECTOR LED ON | O |  |
| B1-4 | PORT 4 CONTROL /NOTE: See truth | O |  |
| B1-5 | PORT 4 CONTROL   table below. | O |  |
| B1-6 | READY/BUSY 0 | O |  |
| B1-7 | READY/BUSY 1 | O |  |
| B4-0 | DATA/POS LINE 0 | I/O |  |

APPENDIX A-continued

| | | |
|---|---|---|
| B4-1 | DATA/POS LINE 1 | I/O |
| B4-2 | DATA/POS LINE 2 | I/O |
| B4-3 | DATA/POS LINE 3 | I/O |
| B4-4 | DATA/POS LINE 4 | I/O |
| B4-5 | DATA/POS LINE 5 | I/O |
| B4-6 | DATA/POS LINE 6 | I/O |
| B4-7 | DATA/POS LINE 7 | I/O |
| B5-0 | MIDDLE WEB CLAMPS ON | O |
| B5-1 | LEFT & RIGHT WEB CLAMPS ON | O |
| B5-2 | spare | O |
| B5-3 | FORWARD MOTOR ON | O Direction: Note 13 |
| B5-4 | REVERSE MOTOR ON | O Direction: Note 13 |
| B5-5 | DEVELOPER MOTOR ON | O Direction: Note 12 |
| B5-6 | WEB ENCODER UP | I Direction: Note 17 |
| B5-7 | spare (DO NOT USE) | O SAVE FOR F8 TEST |
| STROBE | ACK | O |
| EX INT | MAIN PROCESSOR STROBE or COUNT | I |
| RESET | From SELECTOR "B" bit 1 | I |

TRUTH TABLE for Port B1, Bits 4 and 5

| Bits | | |
|---|---|---|
| 5 | 4 | Function |
| 0 | 1 | No input |
| 1 | 0 | LS BYTE |
| 0 | 0 | DATA |
| 1 | 1 | MS BYTE |

PORT B0 INPUT MATRIX TABLE

| ADDRESS B0-BIT 5 4 LOGIC | LEVEL | DATA B0-BIT | FUNCTION | COMMENTS |
|---|---|---|---|---|
| 10 | 01 | 0 | OVER MIN TENSION | See truth table below |
| 10 | 01 | 1 | OVER MAX TENSION | |
| 10 | 01 | 2 | spare | |
| 10 | 01 | 3 | spare | |
| 11 | 00 | 0 | DENSITY NO. 1 | See truth table below |
| 11 | 00 | 1 | DENSITY NO. 2 | |
| 11 | 00 | 2 | BLIP DETECTOR | |
| 11 | 00 | 3 | DEVELOPER POSITION STATE | |
| 00 | 11 | 0 | DEVELOPER UP SENSOR | |
| 00 | 11 | 1 | spare | |
| 00 | 11 | 2 | spare | |
| 00 | 11 | 3 | spare | |
| 01 | 10 | 0 | spare | 4 bits for |
| 01 | 10 | 1 | spare | possible |
| 01 | 10 | 2 | spare | A/D density |
| 01 | 10 | 3 | spare | measurement |

DENSITY TRUTH TABLE

| DENS 1 | DENS 2 | DENSITY |
|---|---|---|
| 0 | 0 | UNDER MINIMUM DENSITY |
| 1 | 0 | ACCEPTABLE RANGE |
| 1 | 1 | OVER MAXIMUM DENSITY |
| 0 | 1 | NOT POSSIBLE (HARDWARE FAULT) |

TENSION TRUTH TABLE

| OVR MAX | OVR MIN | TENSION LEVEL |
|---|---|---|
| 0 | 0 | UNDER MIN AND UNDER MAX |
| 0 | 1 | OVER IN & UNDER MAX |
| 1 | 1 | OVER IN & OVER MAX |
| 1 | 0 | NOT POSSIBLE (FAULTY HARDWARE) |

X-Y TABLE PROCESSOR (UNIT C)

| PORT-BIT | FUNCTION | I/O | COMMENTS |
|---|---|---|---|
| C0-0 | MATRIX BIT 0 | I | |
| C0-1 | MATRIX BIT 1 | I | |
| C0-2 | MATRIX BIT 2 | I | |
| C0-3 | MATRIX BIT 3 | I | |
| C0-4 | ADDRESS BIT 0 | O | |
| C0-5 | ADDRESS BIT 1 | O | |
| C0-6 | ADDRESS BIT 2 | O | |
| C0-7 | X-Y APERTURE CLAMP ON | O | See Page 2, Note 4 |
| C1-0 | spare | O | |
| C1-1 | spare | O | |
| C1-2 | spare | O | |
| C1-3 | spare | O | |
| C1-4 | spare | O | |
| C1-5 | HOME SENSORS ON | O | |
| C1-6 | READY/BUSY 0 | O | |

APPENDIX A-continued

| | | | |
|---|---|---|---|
| C1-7 | READY/BUSY 1 | O | |
| C4-0 | DATA LINE 0 | I/O | |
| C4-1 | DATA LINE 1 | I/O | |
| C4-2 | DATA LINE 2 | I/O | |
| C4-3 | DATA LINE 3 | I/O | |
| C4-4 | DATA LINE 4 | I/O | |
| C4-5 | DATA LINE 5 | I/O | |
| C4-6 | DATA LINE 6 | I/O | |
| C4-7 | DATA LINE 7 | I/O | |
| C5-0 | X-MOTOR DRIVE 'B' | O | |
| C5-1 | X-MOTOR DRIVE 'C' | O | : COLUMN |
| C5-2 | X-MOTOR DRIVE 'A' | O | : |
| C5-3 | X-MOTOR DRIVE 'D' | O | / |
| C5-4 | Y-MOTOR DRIVE 'B' | O | |
| C5-5 | Y-MOTOR DRIVE 'C' | O | : ROW |
| C5-6 | Y-MOTOR DRIVE 'A' | O | : |
| C5-7 | Y-MOTOR DRIVE 'D' | O | / |
| STROBE | ACK | O | |
| EX INT | MAIN PROCESSOR STROBE | I | |
| RESET | From SELECTOR "B" BIT 1 | I | |

PORT C0 INPUT MATRIX TABLE

| ADDRESS C0-BIT 6 5 4 | | DATA C0- | | |
|---|---|---|---|---|
| LOGIC | LEVEL | BIT | FUNCTION | COMMENTS |
| 111 | 000 | 0 | X-Y table X-HOME | |
| 111 | 000 | 1 | X-Y table Y-HOME | |
| 111 | 000 | 2 | spare | |
| 111 | 000 | 3 | spare | |
| 110 | 001 | 0 | spare | |
| 110 | 001 | 1 | spare | |
| 110 | 001 | 2 | spare | |
| 110 | 001 | 3 | spare | |
| 101 | 010 | 0 | spare | |
| 101 | 010 | 1 | spare | |
| 101 | 010 | 2 | spare | |
| 101 | 010 | 3 | spare | |
| 100 | 011 | 0 | spare | |
| 100 | 011 | 1 | spare | |
| 100 | 011 | 2 | spare | |
| 100 | 011 | 3 | spare | |

DUPLICATOR PROCESSOR (UNIT D)

| PORT-BIT | FUNCTION | I/O | COMMENTS |
|---|---|---|---|
| D0-0 | MATRIX DATA BIT 0 | I | SEE |
| D0-1 | MATRIX DATA BIT 1 | I | TABLE |
| D0-2 | MATRIX DATA BIT 2 | I | BELOW. |
| D0-3 | MATRIX DATA BIT 3 | I | FOR |
| D0-4 | ADDRESS BIT 0 | O | BIT |
| D0-5 | ADDRESS BIT 1 | O | FUNCTION |
| D0-6 | ADDRESS BIT 2 | O | |
| D0-7 | spare | O | |
| D1-0 | spare | O | |
| D1-1 | spare | O | |
| D1-2 | spare | O | |
| D1-3 | spare | O | |
| D1-4 | spare | O | |
| D1-5 | spare | O | |
| D1-6 | READY/BUSY 0 | O | |
| D1-7 | READY/BUSY 1 | O | |
| D4-0 | DATA LINE 0 | I/O | |
| D4-1 | DATA LINE 1 | I/O | |
| D4-2 | DATA LINE 2 | I/O | |
| D4-3 | DATA LINE 3 | I/O | |
| D4-4 | DATA LINE 4 | I/O | |
| D4-5 | DATA LINE 5 | I/O | |
| D4-6 | DATA LINE 6 | I/O | |
| D4-7 | DATA LINE 7 | I/O | |
| D5-0 | OPEN SHUTTER | O | |
| D5-1 | PLATTEN MOTOR ON | O | Direction: Note 14 |
| D5-2 | LAMP +100 | O | |
| D5-3 | LAMP +200 | O | Actual +150 Watts |
| D5-4 | spare | O | |
| D5-5 | STACKER ON | O | For stacker units |
| D5-6 | DUP TRANSPORT ON | O | Trigr for D5-7 state |
| D5-7 | DUP TRANSPORT FWD/not REV | O | Direction: Note 15 |
| STROBE | ACK | O | |
| EX INT | MAIN PROCESSOR STROBE | I | |
| RESET | From SELECTOR "B" BIT 1 | I | |

INPUT MATRIX TABLE PORT D0

| ADDRESS D0- | DATA |
|---|---|

APPENDIX A-continued

| BIT 6 5 4 LOGIC | LEVEL | D0-BIT | FUNCTION | COMMENTS |
|---|---|---|---|---|
| 111 | 000 | 0 | spare | |
| 111 | 000 | 1 | SHUTTER OPEN SENSE | |
| 111 | 000 | 2 | SHUTTER CLOSED SENSE | |
| 111 | 000 | 3 | PLATTEN DRIVE OPEN STATE | |
| 110 | 001 | 0 | DUP FILM DRIVE START STATE | |
| 110 | 001 | 1 | GLASS FLAT INSTALLED | |
| 110 | 001 | 2 | DUP FILM TENSION LOST | |
| 110 | 001 | 3 | spare | |
| 101 | 010 | 0 | TRAY FULL (and Stacker Tray missing) | |
| 101 | 010 | 1 | FICHE PRESENT | |
| 101 | 010 | 2 | DUP LAMP ON | |
| 101 | 010 | 3 | STACKER POSITION (for Stacker Units) | |
| 100 | 011 | 0 | FILM IDENTITY | EOT POS  ONE ALWAUS |
| 100 | 011 | 1 | FILM SPEED 0 | : OCCULATED |
| 100 | 011 | 2 | FILM SPEED 1 | : TO SENSE |
| 100 | 011 | 3 | FILM SPEED 2 | TOP POS/ CARTRAGE |

DUPLICATOR FILM IDENTITY/SPEED TRUTH TABLE

NOTCH
bottom = 1
top = 4
0 = NOTCH
1 = NO NOTCH

PORT D0
BIT 0 1 2 3

| 1 | 2 | 3 | 4 | 0 | 1 | 2 | 3 | LOGIC | | | LEVEL | FILM TYPE | EXPOSURE TIME |
|---|---|---|---|---|---|---|---|---|---|---|---|---|---|
| 0 | 0 | 0 | 0 | 0 | 0 | 0 | 1 | 1 | 1 | 1 | | NOT VALID: NO CARTRAGE PRESENT | |
| 0 | 0 | 0 | 1 | 0 | 0 | 1 | 1 | 1 | 1 | 0 | TYPE I | 3.0 SEC | |
| 0 | 0 | 1 | 0 | 0 | 0 | 1 | 0 | 1 | 1 | 0 | 1 | TYPE I | 4.5 SE |
| 0 | 0 | 1 | 1 | 0 | 0 | 1 | 1 | 1 | 1 | 0 | 0 | TYPE I | 6.0 SEC |
| 0 | 1 | 0 | 0 | 0 | 1 | 0 | 0 | 1 | 0 | 1 | 1 | TYPE I | 7.5 SEC |
| 0 | 1 | 0 | 1 | 0 | 1 | 0 | 1 | 1 | 0 | 1 | 0 | TYPE I | 9.0 SEC |
| 0 | 1 | 1 | 0 | 0 | 1 | 1 | 0 | 1 | 0 | 0 | 1 | TYPE I | 10.5 SEC |
| 0 | 1 | 1 | 1 | 0 | 1 | 1 | 1 | 1 | 0 | 0 | 0 | TYPE I | 12.5 SEC |
| 1 | 0 | 0 | 0 | 1 | 0 | 0 | 0 | 0 | 1 | 1 | 1 | TYPE II | RESERVED FOR FUTURE USE |
| 1 | 0 | 0 | 1 | 1 | 0 | 0 | 1 | 0 | 1 | 1 | 0 | TYPE II | RESERVED FOR FUTURE USE |
| 1 | 0 | 1 | 0 | 1 | 0 | 1 | 0 | 0 | 1 | 0 | 1 | TYPE II | RESERVED FOR FUTURE USE |
| 1 | 0 | 1 | 1 | 1 | 0 | 1 | 1 | 0 | 1 | 0 | 0 | TYPE II | RESERVED FOR FUTURE USE |
| 1 | 1 | 0 | 0 | 1 | 1 | 0 | 0 | 0 | 0 | 1 | 1 | TYPE II | RESERVED FOR FUTURE USE |
| 1 | 1 | 0 | 1 | 1 | 1 | 0 | 1 | 0 | 0 | 0 | 1 | TYPE II | RESERVED FOR FUTURE USE |
| 1 | 1 | 1 | 0 | 1 | 1 | 1 | 0 | 0 | 0 | 0 | 1 | TYPE II | RESERVED FOR FUTURE USE |
| 1 | 1 | 1 | 1 | 1 | 1 | 1 | 1 | 0 | 0 | 0 | 0 | | NOT VALID: INCORRECT INSTALLATION |

1. A control system for use with a microimage recording apparatus comprising:
   a system control unit, said system control unit including supervisory processor means for providing a plurality of predetermined sequences of predetermined commands;
   a machine control unit, said machine control unit including at least one second processor means for providing predetermined control signals responsive to said plurality of predetermined sequences of predetermined commands, said second processor means being connected through input/output ports to a plurality of the controlled devices within the microimage recording apparatus, said second processor means including means for monitoring said controlled devices and for providing operational status and error signals;
   memory means coupled to said supervisory processor means and to said second processor means for storing said predetermined commands provided by said supervisory processor means and for storing said operational status and error signals provided by said second processor means; and
   an operator control unit, said operator control unit including third processor means coupled to said supervisory processor means for bidirectional data transfer with said supervisory processor means, said third processor means being coupled to a display means for providing display messages responsive to data received from said supervisory processor means and manually operable entry means for entering a plurality of predefined operator commands, said third processor means being coupled to said manually operable entry means for transferring said operator commands to said supervisory processor means.

2. A control system as recited in claim 1 wherein said supervisory processor means includes means for selectively providing one of said plurality of predetermined sequences of predetermined commands responsive to a selected one of said operator commands.

3. A control system as recited in claim 1 wherein said supervisory processor means includes means for selectively providing said predetermined sequences of predetermined commands responsive to said operational status and error signals.

4. A control system as recited in claim 1 wherein said at least one second processor means includes a master processor means and at least one slave processor means.

5. A control system as recited in claim 4 wherein said master processor means includes means for reading said predetermined commands stored in said memory means, means for decoding said predetermined commands and means for transferring command instructions to said slave processor means, said second slave processor means providing said predetermined control signals for controlling the operation of said controlled devices.

6. A control system for use with a microimage recording apparatus of the type utilizing an elongated master film strip movable along a master film strip path past an exposure station, a master developing station and a duplication station and an elongated duplicate film strip that is moved past the duplication station for the exposure of a microfiche array of images on the duplicate film from images on the master film, said control system comprising:

- supervisory processor means for providing a plurality of predetermined sequences of predetermined commands;
- at least one second processor means for providing control output signals to effect predetermined control logic functions of a plurality of controlled devices in the recording apparatus responsive to said sequences of said predetermined commands, said second processor means providing control signals for controlling the movement of the master film strip along the master film path, said second processor means providing control signals for controlling an optics assembly at the exposure station for sequentially projecting numerous discrete light images in a selected format of rows and columns onto a defined segment of the master film strip, said second processor means providing control signals for controlling developer means at the master developing station to develop said imaged segment of the master film strip, said second processor means providing control signals for controlling the movement of the duplicate film strip and for controlling duplicating means at the duplication station for transferring said developed imaged segment from the master film strip onto the duplicate film strip;
- detecting means coupled to said second processor means for detecting said predetermined functions of said controlled devices and for providing a plurality of operational status signals,
- said second processor means responsive to said plurality of operational status signals and to said predetermined sequences of said predetermined commands providing operational status and error signals in a predetermined format;
- said supervisory processor means responsive to said operational status signals providing a selected one of said predetermined sequences of predetermined commands.

7. A control system as recited in claim 6 wherein said second processor means further provides command completed acknowledgement signals responsive to said predetermined commands.

8. A control system as recited in claim 6 further comprising memory means coupled to said supervisory processor means and to said second processor means for storing said predetermined commands provided by said supervisory processor means and for storing said operational status and error signals provided by said second processor means.

9. A control system as recited in claim 6 wherein said at least one second processor means includes a master processor means and at least one slave processor means.

10. A control system as recited in claim 9 said master processor means includes means for reading said predetermined commands stored in said memory means, means for decoding said predetermined commands and means for transferring command instructions to said slave processor means, said second slave processor means providing said predetermined control signals for controlling the operation of said controlled devices.

11. A control system as recited in claim 6 further comprising third processor means coupled to said supervisory processor means for bidirectional data transfer with said supervisory processor means, said third processor means being coupled to a display means for providing display messages responsive to data received from said supervisory processor means and manually operable entry means for entering a plurality of predefined operator commands, said third processor means being coupled to said manually operable entry means for transferring said operator commands to said supervisory processor means.

12. A control system as recited in claim 11 wherein said supervisory processor means selectively provides one of said plurality of predetermined sequences of predetermined commands responsive to a selected one of said operator commands.

13. A control system for use with a microimage recording apparatus of the type utilizing an elongated master film strip movable along a master film strip path past an exposure station, a master developing station and a duplication station and an elongated duplicate film strip that is moved past the duplication station for the exposure of a microfiche array of images on the duplicate film from images on the master film, said control system comprising:

- supervisory processor means for providing a plurality of predetermined sequences of predetermined commands;
- at least one second processor means for providing predetermined control output signals to effect predetermined control logic functions of a plurality of controlled devices within the recording apparatus responsive to said plurality of predetermined sequences of predetermined commands, said second processor means being connected through input-output ports to said controlling devices including drive means for moving the master film along the master film processing path and clamp means for positioning and tensioning the master film;
- detecting means coupled to said second processor means for detecting said predetermined functions of said controlled devices and for providing a plurality of operational status signals; said detecting means including means for detecting movement of the master film and providing a film movement signal and means for detecting an indexing image on the master film and providing a detected indexing image signal;
- said second processor means responsive to said film movement signal and said detected indexing image signal and to said predetermined sequences of predetermined commands providing predetermined film movement signals and predetermined film position signals;
- said supervisory processor means being responsive to said predetermined film movement signals and said predetermined film position signals for providing a selected one of said predetermined sequences of predetermined commands.

14. A control system as recited in claim 13 wherein said second processor means further provides command completed acknowledgement signals in response to said predetermined commands.

15. A control system as recited in claim 13 further comprising memory means coupled to said supervisory processor means and to said second processor means for storing said predetermined commands provided by said supervisory processor means and for storing said operational status and error signals provided by said second processor means.

16. A control system as recited in claim 13 wherein said at least one second processor means includes a master processor means and at least one slave processor means.

17. A control system as recited in claim 16 said master processor means includes means for reading said predetermined commands stored in said memory means, means for decoding said predetermined commands and means for transferring command instructions to said slave processor means, said second slave processor means providing said predetermined control signals for controlling the operation of said controlled devices.

18. A control system as recited in claim 13 further comprising third processor means coupled to said supervisory processor means for bidirectional data transfer with said supervisory processor means, said third processor means being coupled to a display means for providing display messages responsive to data received from said supervisory processor means and manually operable entry means for entering a plurality of predefined operator commands, said third processor means being coupled to said manually operable entry means for transferring said operator commands to said supervisory processor means.

19. A control system as recited in claim 18 wherein said supervisory processor means selectively provides one of said plurality of predetermined sequences of predetermined commands responsive to a selected one of said operator commands.

20. A control system as recited in claim 13 wherein said second processor means further provides error signals responsive to said film movement signal and said detected indexing image signal, said error signals including a no-film-movement error signal, a fogged master film error signal and no blip detected.

21. A control system as recited in claim 13 wherein said means for detecting movement of the master film include an encoder roller device.

22. A control system as recited in claim 13 wherein said means for detecting an indexing image on the master film include at least one photoconductive cell.

23. A control system for use with a microimage recording apparatus of the type utilizing an elongated master film strip movable along a master film strip path past an exposure station including a movable lens through which discrete light images are focused and directed onto the master film strip, a master developing station and a duplication station and an elongated duplicate film strip that is moved past the duplication station for the exposure of a microfiche array of images on the duplicate film from images on the master film, said control system comprising:

supervisory processor means for providing a plurality of predetermined sequences of predetermined commands;

at least one second processor means for providing predetermined control output signals to effect predetermined control logic functions of a plurality of controlled devices within the recording apparatus responsive to said plurality of predetermined sequences of predetermined commands, said second processor means being connected through input-output ports to said controlling devices including an X stepper motor for moving the lens at the exposure station in the direction of rows, a Y stepper motor for moving the lens at the exposure station in the direction of columns and clamp means for positioning the master film relative to the lens;

detecting means coupled to said second processor means for detecting said predetermined functions of said controlled devices and for providing a plurality of operational status signals, said detecting means including means for detecting the X and Y position of the lens for providing X and Y position signals;

said second processor means responsive to said X and Y position signals and to said predetermined sequences of predetermined commands providing predetermined command completed acknowledgement signals and error signals;

said supervisory processor means being responsive to said predetermined command completed acknowledgement signals and said error signals for providing a selected one of said predetermined sequences of predetermined commands.

24. A control system as recited in claim 23 further comprising memory means coupled to said supervisory processor means and to said second processor means for storing said predetermined commands provided by said supervisory processor means and for storing said operational status and error signals provided by said second processor means.

25. A control system as recited in claim 23 wherein said at least one second processor means includes a master processor means and at least one slave processor means.

26. A control system as recited in claim 25 said master processor means includes means for reading said predetermined commands stored in said memory means, means for decoding said predetermined commands and means for transferring command instructions to said slave processor means, said second slave processor means providing said predetermined control signals for controlling the operation of said controlled devices.

27. A control system as recited in claim 23 further comprising third processor means coupled to said supervisory processor means for bidirectional data transfer with said supervisory processor means, said third processor means being coupled to a display means for providing display messages responsive to data received from said supervisory processor means and manually operable entry means for entering a plurality of predefined operator commands, said third processor means being coupled to said manually operable entry means for transferring said operator commands to said supervisory processor means.

28. A control system as recited in claim 27 wherein said supervisory processor means selectively provides one of said plurality of predetermined sequences of predetermined commands responsive to a selected one of said operator commands.

29. A control system for use with a microimage recording apparatus of the type utilizing an elongated master film strip movable along a master film strip path past an exposure station, a developing station and a duplication station and an elongated duplicate film strip that is moved past the duplication station for the exposure of a microfiche array of images on the duplicate film from images on the master film, said control system comprising:

supervisory processor means for providing a plurality of predetermined sequences of predetermined commands;

at least one second processor means for providing predetermined control output signals to effect predetermined control logic functions of a plurality of controlled devices within the recording apparatus responsive to said plurality of predetermined sequences of predetermined commands, said second processor means being connected through input-output ports to said controlling devices including drive means for moving the duplicate film along a duplicate film processing path past the duplication station and vacuum clamp means for positioning and holding the duplicate film in contact with the master film at the duplication station;

detecting means coupled to said second processor means for detecting said predetermined functions of said controlled devices and for providing a plurality of operational status signals, said detecting means including means for detecting movement of the duplicate film and providing a film movement signal and means for detecting the position of said vacuum clamp means and providing clamp position signals;

said second processor means responsive to said film movement signal and said clamp position signals and to said predetermined sequences of predetermined commands providing predetermined film movement signals, predetermined command completed acknowledgement signals and predetermined error signals;

said supervisory processor means being responsive to said predetermined film movement signals, said predetermined command completed acknowledgement signals and said predetermined error signals providing a selected one of said predetermined sequences of predetermined commands.

30. A control system as recited in claim 29 further comprising memory means coupled to said supervisory processor means and to said second processor means for storing said predetermined commands provided by said supervisory processor means and for storing said operational status signals provided by said second processor means.

31. A control system as recited in claim 29 wherein said at least one second processor means includes a master processor means and at least one slave processor means.

32. A control system as recited in claim 31 said master processor means includes means for reading said predetermined commands stored in said memory means, means for decoding said predetermined commands and means for transferring command instructions to said slave processor means, said second slave processor means providing said predetermined control signals for controlling the operation of said controlled devices.

33. A control system as recited in claim 29 further comprising third processor means coupled to said supervisory processor means for bidirectional data transfer with said supervisory processor means, said third processor means being coupled to a display means for providing display messages responsive to data received from said supervisory processor means and manually operable entry means for entering a plurality of predefined operator commands, said third processor means being coupled to said manually operable entry means for transferring said operator commands to said supervisory processor means.

34. A control system as recited in claim 33 wherein said supervisory processor means selectively provides one of said plurality of predetermined sequences of predetermined commands responsive to a selected one of said operator commands.

35. A control system for use with a microimage recording apparatus of the type utilizing an elongated master film strip movable along a master film strip path past an exposure station for exposing discrete light images on the master film, a developing station for developing exposed images on the master film and a duplication station for exposing onto an elongated duplicate film strip that is moved past the duplication station an array of images from the master film, said control system comprising:

supervisory processor means for providing a plurality of predetermined sequences of predetermined commands;

at least one second processor means for providing predetermined control output signals to effect predetermined control logic functions of a plurality of controlled devices within the recording apparatus responsive to said plurality of predetermined sequences of predetermined commands;

detecting means coupled to said second processor means for detecting an optical density of the developed images on the master film and providing a density signal responsive to said predetermined control output signals of said second processor means;

said second processor means providing said detected density signals to said supervisory processor means; and said supervisory processor means including means for storing an acceptable density range signal, means for exposing on the master film a first step tablet between a predetermined maximum exposure intensity range, means for comparing said detected density signals for said first step tablet with said stored acceptable density range signal to identify an acceptable exposure intensity range; means for exposing on the master film a second step tablet between said identified acceptable exposure intensity range; and means for comparing said detected density signals for said second step tablet with said stored density range signals to identify acceptable exposure intensity values; and means for calculating an average value of said identified exposure intensity values to establish an exposure intensity for the exposure station.

36. In a microimage recording system of the type utilizing a cathode ray tube for exposing images onto a photographic recording medium and means for adjusting the amount of exposure of said recording medium in order to obtain a desired image density, the improvement wherein the exposure adjusting means comprises:
  means for adjusting the beam intensity of said cathode ray tube over a predetermined range to thereby expose a graduated density area on the recording medium;
  means for developing the graduated density area;
  means for analyzing the graduated density area to detect at least a predetermined density and correlate said density to the beam intensity producing it;
  means for adjusting the beam intensity in response to said correlation; and
  wherein said beam intensity adjusting means includes means responsive to said analyzing means for adjusting the beam over a second predetermined range that is narrower than said predetermined range and includes the intensity that produced the predetermined density to expose a second graduated density area, said analyzing means being responsive to said second graduated density area upon development thereof by said developing means to detect at least one predetermined area and correlate it to the beam intensity producing it.

37. The improvement recited in claim 36 wherein said beam intensity adjusting means is responsive to the analysis of said second graduated density area made by said analyzing means for adjusting the beam intensity for subsequent exposure.

38. In a recording apparatus of the type that records images displayed on a cathode ray tube onto a photographic recording medium, said recording apparatus including means for controlling the intensity of the image displayed on the cathode ray tube to compensate for variations in film sensitivity, said control system comprising:
  means for generating a predetermined range of control signals for varying the intensity of the brightness of the cathode ray tube over a range of light intensities determined by the control signals;
  means for exposing different areas of the recording medium to different cathode ray tube light intensities;
  means for developing the exposed areas;
  means for detecting the densities of the developed areas to provide a density signal for each area;
  means for comparing said density signals with signals defining an acceptable range of densities; and
  means for reducing the range of brightness of said cathode ray tube to a second predetermined range corresponding to areas within the acceptable range of densities.

* * * * *